(12) United States Patent
Simpson et al.

(10) Patent No.: US 11,746,264 B2
(45) Date of Patent: Sep. 5, 2023

(54) CROSSLINKING OF LOOSE INSULATING POWDERS

(71) Applicant: Alliance for Sustainable Energy, LLC, Golden, CO (US)

(72) Inventors: Lin Jay Simpson, Lakewood, CO (US); Chaiwat Engtrakul, Louisville, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 33 days.

(21) Appl. No.: 17/314,101

(22) Filed: May 7, 2021

(65) Prior Publication Data

US 2021/0348041 A1 Nov. 11, 2021

Related U.S. Application Data

(60) Provisional application No. 63/021,381, filed on May 7, 2020, provisional application No. 63/021,395, filed on May 7, 2020.

(51) Int. Cl.
| | |
|---|---|
| *C09J 133/14* | (2006.01) |
| *H01B 1/12* | (2006.01) |
| *H01B 3/08* | (2006.01) |
| *H01B 17/64* | (2006.01) |
| *H01B 19/04* | (2006.01) |

(Continued)

(52) U.S. Cl.
CPC ............ *C09J 133/14* (2013.01); *H01B 1/125* (2013.01); *H01B 1/127* (2013.01); *H01B 1/128* (2013.01); *H01B 3/087* (2013.01); *H01B 17/64* (2013.01); *H01B 19/04* (2013.01); *C08K 3/36* (2013.01); *C08K 5/55* (2013.01); *C08K 7/14* (2013.01); *C08K 7/28* (2013.01)

(58) Field of Classification Search
CPC . C09J 133/14; C08K 3/36; C08K 5/55; C08K 7/14; C08K 7/28
USPC .......................................................... 524/35
See application file for complete search history.

(56) References Cited

U.S. PATENT DOCUMENTS

| | | |
|---|---|---|
| 3,167,159 A | 1/1965 | Bovenkerk |
| 3,622,437 A | 11/1971 | Hobaica et al. |

(Continued)

FOREIGN PATENT DOCUMENTS

| | | | |
|---|---|---|---|
| EP | 3246357 A1 | | 11/2017 |
| JP | 2000-246824 | * | 9/2000 |

(Continued)

OTHER PUBLICATIONS

Machine translation of JP 2000-246824 (Year: 2000).*

(Continued)

*Primary Examiner* — Doris L Lee
(74) *Attorney, Agent, or Firm* — Neal Vickery

(57) ABSTRACT

Described herein are materials and methods useful in the field of insulation, including building materials, refrigeration, cryogenics, and shipping, amongst others. Advantageously, the provided materials and method provide low thermal conductivities and increased mechanical strength, allowing for efficient insulating in a diverse range of applications. The provided materials and methods include individual particles connected by a polymer network that links individual particles and may include hollow or evacuated capsules and various strengthening agents.

14 Claims, 20 Drawing Sheets

(51) Int. Cl.
  *C08K 5/55* (2006.01)
  *C08K 3/36* (2006.01)
  *C08K 7/28* (2006.01)
  *C08K 7/14* (2006.01)

(56) References Cited

U.S. PATENT DOCUMENTS

| | | | |
|---|---|---|---|
| 3,668,059 A * | 6/1972 | Economy | C01B 21/064 |
| | | | 57/200 |
| 4,978,690 A * | 12/1990 | Hill | C08J 9/35 |
| | | | 521/184 |
| 5,194,459 A | 3/1993 | Sato et al. | |
| 5,385,764 A | 1/1995 | Andersen et al. | |
| 5,433,056 A | 7/1995 | Benson et al. | |
| 5,580,409 A | 12/1996 | Andersen et al. | |
| 5,580,624 A | 12/1996 | Andersen et al. | |
| 5,626,954 A | 5/1997 | Andersen et al. | |
| 5,665,439 A | 9/1997 | Andersen et al. | |
| 5,665,787 A * | 9/1997 | Nowak | C08J 9/32 |
| | | | 521/64 |
| 5,705,237 A | 1/1998 | Andersen et al. | |
| 5,753,308 A | 5/1998 | Andersen et al. | |
| 6,168,833 B1 | 1/2001 | Eushake et al. | |
| 9,944,452 B1 | 4/2018 | Mills et al. | |
| 10,865,136 B2 | 12/2020 | Simpson et al. | |
| 2004/0016202 A1 | 1/2004 | Hoffman | |
| 2005/0255318 A1 | 11/2005 | Czerny | |
| 2010/0126618 A1 | 5/2010 | D'Souza et al. | |
| 2010/0279100 A1 | 11/2010 | Heikkila et al. | |
| 2011/0266158 A1 | 11/2011 | Chavez Amado et al. | |
| 2012/0100289 A1 | 4/2012 | Egan et al. | |
| 2012/0133068 A1 | 5/2012 | Wagner et al. | |
| 2012/0261064 A1 | 10/2012 | Boday et al. | |
| 2015/0192228 A1 | 7/2015 | Mutsuda et al. | |
| 2016/0003402 A1 | 1/2016 | Hidaka et al. | |
| 2019/0144343 A1 | 5/2019 | Deka et al. | |
| 2019/0145572 A1 | 5/2019 | Deka et al. | |

FOREIGN PATENT DOCUMENTS

| | | |
|---|---|---|
| WO | 9419172 | 9/1994 |
| WO | 2008047334 A1 | 4/2008 |
| WO | 2011106337 A1 | 9/2011 |

OTHER PUBLICATIONS

Corresponding International Search Report from PCT/US21/31222 dated Sep. 24, 2021, 5 pages.
Corresponding Written Opinion of the International Searching Authority from PCT/US21/31222 dated Sep. 24, 2021, 7 pages.
International Search Report from PCT/US21/31279 dated Sep. 29, 2021; 3 pages.
Written Opinion of the International Searching Authority from PCT/US21/31222 dated Sep. 29, 2021; 6 pages.
Allen, M.S. et al., "Advances in Microsphere Insulation Systems," 2003 Cryogenic Engineering Conference, CEC C2-C-01; 8 pages.
Kulesa, T. et al., "Analytical study of mechanical properties of syntactic foams," South Dakota School of Mines & Technology, Dec. 10, 2019, 8 pages.
Li, B. et al., "Effect of microstructure and physical parameters of hollow glass microsphere on insulation performance," Materials Letters, vol. 65, 2011, Mar. 2011, 3 pages.
Liao, Y. et al., "Thermal conductivity of powder silica hollow spheres," Elsevier Thermochimica Acta, vol. 526, 2011; 7 pages.
Meng, X., "An overview of molecular layer deposition for organic and organic-inorganic hybrid materials: mechanisms: growth characteristics and promising applications," Journal of Materials Chemistry A, vol. 5, 2017, 53 pages.
Notario, B. et al., "Experimental validation of the Knudsen effect in nanocellular polymeric foams," Elsevier Polymer, vol. 56, 2015, 11 pages.
Wang, Q. et al., "Fabrication and properties of thermal insulating material using hollow glass microspheres bonded by aluminum-chrome-phhosphate and tetraethyl orthosilicate," Ceramics International, 2015, http://dx.doi.org/10.1016/j.ceramint.2015.12.003, 7 pages.
Zhang, Y-I et al., "Heat-insulating materials with high-temperature resistance through binding hollow glass microspheres with vinyl-functionalized polyborosiloxane," Journal Material Science, 2020, https://doi.org/10.1007/s10853-020-05046-y, 16 pages.
Caps, R. et al., "Aerogels for Thermal Insulation," book chapter from SpringerLink Sol-Gel Technologies for Glass Producers and Users, M.A. Aegerter et al. editors, 2004, 5 pages.

* cited by examiner

CROSSLINKING OF LOOSE INSULATING POWDERS

CROSS-REFERENCE TO RELATED APPLICATIONS

This application claims priority from U.S. Provisional Patent Application Nos. 63/021,381 and 63/021,395, both filed on May 7, 2020, the contents of which are incorporated herein by reference in their entirety.

CONTRACTUAL ORIGIN

The United States Government has rights in this invention under Contract No. DE-AC36-08GO28308 between the United States Department of Energy and Alliance for Sustainable Energy, LLC, the Manager and Operator of the National Renewable Energy Laboratory.

BACKGROUND

Today's super insulation is typically made from fumed silica that requires energy intensive high temperature flame processing or from aerogels that require expensive precursors and energy intensive critical-point drying. These insulators are expensive, from $5 to $60 per square foot for R-20, and only provide their best insulating properties when held in a secondary containment system that holds high vacuum which has virtually no conductive or convective thermal transport. Maintaining the lightweight and reduction of thermal shorting provided by vacuum containing insulating systems is difficult. The vacuum in applications like vacuum insulated panels (VIP) typically degrades within a few years and thus the insulation value decreases as well.

Hollow capsules including glass microbubbles are usually powders that have thermal conductivities between 0.04 and 0.15 W/m-K. Microbubbles can be used to decrease thermal conductivity in host materials and can provide insulating properties because the gas/air inside typically has low thermal conductivity and if their wall thicknesses are relatively thin then the overall effective thermal conduction is low. The effective thermal conductivity of materials with embedded microbubbles is dominated by the thermal conductivity of the host materials (e.g., polymers or ceramics), resulting in typical effective thermal conductivities in the 0.1 to 1 W/m-K range.

Powdered microbubbles with no host matrix can be used as insulation, but their highly dispersible nature makes them difficult to work with and they are mostly only useful in mechanically strong structures that reduce the insulating value of the microbubbles, similar to the reduction of the insulative value the microbubbles cause by being embedded in a polymer matrix. However, as with standard fiberglass insulation, air on the outside of the microbubbles is a better insulation than any solid matrix material, because the thermal conduction of air is only around 0.025 W/m-K and in the small spaces between the microbubbles there is virtually no convective heat transport.

To overcome the problems of creating insulative materials using microbubbles, the "dispersion issue" of dispersive particles can be resolved because the particles can be glued or bonded together in a number of different ways, as described herein, without substantively increasing the effective thermal conductivity. For example, ceramic particles can be sintered at high temperatures to form a solid bond between particles. However, this is energy intensive and significantly increases the thermal conductivity between particles as the sintered contact areas are substantially larger than the relatively small point contact areas between loose particles. Solution based processing has been used to glue/bond particles together. However, there are substantial issues with controlling surface wetting at the desired locations and removing the solvents without reducing the packing density and creating large air cavities in the structures that decrease the strength and potentially increases the thermal conductivity.

SUMMARY

Described herein are materials and methods useful in the field of insulation, including building materials, refrigeration, cryogenics, and shipping, amongst others. The described insulating materials may also be useful in acoustic insulation/dampening, for example, as building materials or ceiling/wall panels designed to limit the transfer of sound or noise. Advantageously, the provided materials and method provide low thermal conductivities and increased mechanical strength, allowing for efficient insulating in a diverse range of applications. The provided materials and methods include individual particles connected by a polymer network that links individual particles and may include hollow or evacuated capsules and various strengthening agents.

The provided material and methods may utilize cyanoacrylate monomers, which polymerize to form a polycyanoacrylate. The polymerization can be accelerated with water or water vapor. This allows for the monomer to be introduced to the surface of the insulating particles in the liquid or vapor phase and enter the small pores between the surfaces of the insulating particles, which when reacted with the water which may already be present in the form of humidity in an assemblage of insulating particles provides a higher degree of penetration of the polymer into the assemblage. Further, use of water and cyanoacrylates or other polymer adhesives as described herein may allow for similar uniformity and thickness as physical vapor deposition, which reduces process steps compared to other existing methods.

In an aspect, provided is an insulating material comprising: a) a plurality of insulating particles; b) a polymer crosslinking the plurality of insulating particles, wherein the polymer comprises an adhesive; wherein the plurality of insulating particles have a packing density greater than or equal to 60%. The adhesive may comprise a cyanoacrylate.

The crosslinking polymer may be formed using gas phase chemistries that can be deposited sequentially and produce self-limiting surface reactions. Cyanoacrylate monomers or other monomers or reactants capable of forming a polymer adhesive can be fumed through small, contorted pores between the insulating particles where they subsequently deposit on the particle surfaces. Inherent water or other accelerants on the insulating particles or co-delivered with the monomers in the vapor phase catalyze and help accelerate the polymerization processes to effectively crosslink the insulating particles together.

The insulating particles may comprise fumed silica and/or hollow capsules. The fumed silica or other insulating materials, for example, vermiculite, zeolite or pearlite, may be provided in interstitial spaces between hollow capsules. Examples of hollow capsules include hollow glass microspheres, hollow polymer microspheres or other hollow particles with spherical or non-spherical shapes, e.g., cubes, pills, cylinders, etc. Suitable hollow glass microspheres include soda-lime-silicate glass microspheres and sodium borosilicate glass microspheres.

In another aspect, provided is an insulating material comprising close-packed hollow capsules, wherein each capsule is at least partially covered with a layer of a polymer adhesive having a substantially uniform thickness of at least 1 monolayer which bonds the hollow capsules together.

The packing density may be greater than or equal to 70%, 80%, 90% or, optionally, 95%. The packing density may be selected from the range of 50% to 99%, 60% to 99%, 70% to 99%, 80% to 99% or, optionally, 90% to 99%. The insulating material may have a thermal conductivity less than or equal to 50, 25, 10, 9, 5, 2 or, optionally, 1 mW/m-K.

A strengthening agent may be used in conjunction with the polymer to form covalent bonds within the polymer or between the polymer and the particles for strengthening the crosslinking afforded by the polymer. The strengthening agent may be co-delivered with the monomers or other reactants, simultaneously or sequentially. Suitably, the strengthening agent may contain boron, for example in the form of a Lewis acid. The boron-containing strengthening agent may comprise, for example, triisopropyl borate, a boron halide, e.g., boron trichloride, boron trifluoride or boron triiodide, trimethyl borate, an alkyl borate, boric acid, or a combination thereof. The insulating material may further comprise a reinforcing fiber, or a plurality thereof. The reinforcing fiber may comprise greater than or equal to 0.5% wt., 1% wt., 2% wt, or optionally, 3% wt. of the total weight of the insulating material. The reinforcing fiber may be chemically bonded to the polymer network, physically bound to the polymer network, contained in a void space between the insulating particles or a combination thereof. The fiber may comprise, for example, cellulose, a plant material, a second polymer, glass or a combination thereof.

The strengthening agent and/or the reinforcing fiber may allow for enhanced mechanical properties, including strength and flexibility. The insulating material may have a maximum compressive stress greater than or equal to 0.05, 0.10, 0.15, 0.2, 0.25, or optionally, 0.5 MPa. The insulating material may have a compressive strength greater than or equal to 0.25, 0.3, 0.4, 0.48, 0.5, 0.6, 0.7 or, optionally, 0.8 MPa at 10% deformation. The insulating material may have a shear strength greater than or equal to 0.01 MPa, 0.05 MPa, 0.1 MPa, or 0.2 MPa. The insulating material may have a tensile strength greater than or equal to 0.01 MPa, 0.05 MPa, 0.1 MPa, or 0.2 MPa. Where relevant, the provided mechanical properties may be measured via standard techniques at room temperature, e.g., around 25° C.

The polymer adhesive may be, for example, a cyanoacrylate adhesive as described herein, which serves as an organic linker. The cyanoacrylate may comprise an alkyl cyanoacrylate, for example a $C_{1-10}$alkyl cyanoacrylate including methyl cyanoacrylate, ethyl cyanoacrylate, butyl cyanoacrylate, octyl cyanoacrylate or a combination thereof. Particular examples of alkyl cyanoacrylates include methyl 2-cyanoacrylate, ethyl 2-cyanoacrylate, n-butyl cyanoacrylate and 2-octyl cyanoacrylate. Cyanoacrylates may be derived from ethyl cyanoacrylate and related or homologous esters. The cyanoacrylate may comprise ethyl 2-cyanoacrylate and octyl cyanoacrylate.

Other polymer adhesives may also be used to crosslink the insulating particles including, for example, polyvinyl alcohols, polypyrrole and poly(3,4-ethylenedioxythiophene) ("PEDOT"), polyimides, polyazomethines, polyureas, polyamides, poly-imide-polyamides, polythioureas, polyethylene terephthalate, and alucones. The polymers may be capable of being formed by vapor deposition necessary to infiltrate void space of the hollow capsules in tightly packed formation. Crosslinking with polyvinyl alcohol, polypyrrole or PEDOT may be especially advantageous in view of the conducting properties of these polymers, as described herein. Suitably, the cyanoacrylate or other polymer adhesives may be capable of being formed by vapor deposition at a temperature below about 200° C. at atmospheric or sub-atmospheric pressure. Additional information regarding useful polymers and vapor deposition may be found in Meng, X. "An overview of molecular layer deposition for organic and organic inorganic hybrid materials: mechanisms and growth characteristic and promising applications" *J Mater Chem A,* 2017, 5, 18326, which is hereby incorporated by reference in its entirety. These additional polymers maybe used in conjunction with cyanoacrylates or as substitutes.

The polymer may interpose between at least some adjacent insulating particles for cross-linking the particles. It will be appreciated that some adjacent particles may contact one another directly. At least some adjacent particles may be separated by a gap. The polymer may encapsulate, e.g., fully encapsulate, an outer surface of each one of the plurality of insulating particles. Alternatively, the polymer may partially encapsulate an outer surface of each one of the plurality of insulating particles. The polymer adhesive may cover at least 1%, 10%, 25%, 50%, 75%, 90%, 99% or, optionally, 100% of a surface area of each capsule.

The polymer may form a thin, substantially uniform layer or film on the outer surface of each insulating particle. Typically, the layer of polymer may be thicker in localized regions, for example where adjacent particles are disposed closest to one another. The layer may comprise a nanoscale film. The layer of polymer may thus have a thickness selected from the range of 1 to 2, 1 to 5, 5 to 10, 1 to 10, 1 to 25, 1 to 50, 1 to 100 or optionally, 1 to 250 monolayers. For example, a monolayer may be a substantially uniform thickness of approximately one polymer molecule or one monomer. The polymer is not burned or otherwise thermally decomposed. The insulating material may comprise less than 1% wt., 1 to 2% wt., 1 to 5% wt., 5 to 10% wt., 1 to 10% wt., or optionally 1 to 100% wt. % polymer with respect to the weight of the composite material.

The insulating material may have a volume comprising greater than or equal 10%, 20%, 30%, 40%, 50%, or 60% vacuum, e.g., the volume occupied by the vacuum in the hollow capsules.

The insulating material may comprise a fluoropolymer coating, for example, on a surface of the insulating particles to increase the strength of the bond between the insulating particles and the polymer. The fluoropolymer coating may comprise at least one perfluoroalkyl or polyfluoroalkyl acrylate or alkylacrylate. For example, the fluoropolymer coating may comprise a perfluoro$C_{6-12}$alkyl- or polyfluoro$C_{6-12}$alkyl $C_{0-3}$alkylacrylate, typically an acrylate or methacrylate; for example, 1H,1H,2H,2H-perfluorodecyl acrylate (PFDA) or 1H,1H,2H,2H-perfluorodecyl methacrylate (PFDMA). The insulating material may also incorporate boron containing sites on a surface of the insulating particles to increase bond strength.

The hollow capsules may have a diameter selected from the range of 5 nm to 1 cm, 100 nm to 1 cm, 1000 nm to 1 cm, 1000 nm to 10 mm, 1000 nm to 1 mm, 0.01 mm to 10 mm, 0.01 mm to 1 mm, 0.1 mm to 1 mm, or optionally, 0.01 mm to 0.1 mm. Diameter may be measured as average diameter, e.g., the average diameter across the total number of hollow capsules. Diameter may be measured as effective diameter, e.g., the diameter of the largest or smallest dimension for non-spherical particles.

The hollow capsules may comprise first and second plurality of hollow capsules of different size distributions; the hollow capsules of the first plurality having a mean diameter greater than the mean diameter of the hollow capsules of the second plurality; the two pluralities of hollow capsuling being substantially heterogeneously mixed to increase packing density. One or both of the first and second plurality of hollow capsules may suitably have a narrow size distribution. For example, one or both pluralities of hollow capsules may independently have a coefficient of variation of particle size of less than 50%, preferably less than 20%, more preferably less than about 15%. For example, one or both pluralities of hollow capsules may independently have a coefficient of variation of particle size in the range of about 1-15%, e.g., 2%, 3%, 4%, 5%, 6%, 7%, 8%, 9%, 10%, 11%, 12%, 13% or 14%.

The hollow capsules may therefore comprise a plurality of small hollow capsules and a plurality of large hollow capsules. Providing two or more different sizes or size regimes may allow for higher packing density and, in turn, lower thermal conductivity. The small hollow capsules may have a diameter selected from the range of 1000 nm to 0.1 mm, 0.01 mm to 0.1 mm, 0.01 mm to 0.05 mm, or optionally, 0.01 mm to 0.03 mm. The large hollow capsules may have an average or mean diameter selected from the range of 0.01 mm to 1 cm, 0.1 mm to 10 mm, 0.1 mm to 1 mm, 0.5 mm to 1 mm, or optionally, 0.1 mm to 0.5 mm. The small hollow capsules may have an average diameter with a ratio of 1:2 to 1:10, 1:2 to 1:4, 1:2 to 1:5, 1:5 to 1:10, 1:2 to 1:100, or 1:10 to 1:100 with respect to the average diameter of the large hollow capsules. The ratio of the mean diameters of larger hollow capsules to the smaller hollow capsules may be between 2:1 to 4:1, 2:1 to 5: 2:1 to 10:1, 5:1 to 10:1 or 10:1 to 100:1. The ratio of the number of smaller capsules to larger capsules may be 1:1 to 5:1, 1:1 to 10:1, 5:1 to 10:1, 5:1 to 15:1, 5:1 to 20:1, 10:1 to 50:1 or 10:1 to 100:1. Providing a third and/or fourth size of hollow capsule may provide packing densities over 95%.

The hollow capsules may be evacuated, where the internal void space of the capsule is at or near a vacuum to further reduce the thermal conductivity of the insulating material. For example, the internal pressure of the hollow capsules may be about 1 atm, less than or equal to 0.1 atm, less than or equal to 0.01 atm, less than or equal to 0.001 atm, less than or equal to 0.0001 atm, less than or equal to 0.00001 atm, or a full vacuum.

In yet another aspect, provided is an insulating composite comprising any of the insulating materials described herein and a substrate.

Advantageously, the provided materials and methods may also provide reduced radiative heat transfer by applying coatings or additives (e.g., carbon black, silicon carbide) to insulating materials in order to alter the emissivity, including in the infrared electromagnetic spectrum. Advantageously, the provided materials and methods, while increasing thermal conductivity, provide an overall reduction in heat transfer and therefore provide superior insulation.

The described material and methods may utilize conducting polymers in conjunction with oxide semiconductors to decrease emissivity to decrease radiative transport while limiting additional conductive transport. Certain semiconducting materials, such as tin oxides, indium oxides, titanium oxides and zinc oxides provide significant advantages over other metal oxides, for example, iron oxide. When paired with polymers that provide additional reflectivity over the desired electromagnetic spectrum ranges, overall heat transfer may be decreased and materials with very high insulative properties may be produced.

The insulating particles may be provided with a low-emissivity coating on a surface of said insulating particles. The low-emissivity coating may have a thermal conductivity of less than or equal to 9 W/m-K. The low-emissivity coating may have an emissivity of less than or equal to 0.3 of electromagnetic radiation having a wavelength selected from the range of 1 mm to 0.4 μm. Optionally, the low emissivity coating may have an emissivity less than 0.5, 0.4, 0.25, 0.2, 0.15, 0.1, or 0.05.

The low-emissivity coating may comprise a conducting polymer, for example, polypyrrole, poly(3,4-ethylenedioxythiophene) (PEDOT), polyvinyl alcohol or a combination thereof. The low-emissivity coating may comprise conducting oxide semiconductors, for example, tin oxide, indium oxide, titanium oxide, zinc oxide, boron tin trioxide or a combination thereof.

The low-emissivity coating may be a thin film having a thickness less than or equal to 5, 10, 25, 50 or 100 atomic layers. Alternately, the thin film may have a thickness of 1, 2, 5, 10, 50 or 100 monolayers with respect to individual monomers or molecules. The thin film may have a thickness that is substantially uniform. The low-emissivity coating may partially or fully cover an outer surface of the insulating material.

The low-emissivity coating may reflect greater than 25%, 30%, 35%, 40%, 50%, 60%, 70%, 80%, 90%, 95% or optionally, 99% of the electromagnetic radiation having a wavelength selected from 2.5 μm to 20 μm. Alternately, the electromagnetic radiation may have a wavelength selected from 2.5 μm to 100 μm, 4 μm to 20 μm, 4 μm to 100 μm, 2.5 μm to 500 μm or 2.5 μm to 1000 μm.

The low-emissivity coating may reflect greater than 25%, 30%, 35%, 40%, 50%, 60%, 70%, 80%, 90%, 95% or optionally, 99% of the electromagnetic radiation having a wavelength selected from 2.5 μm to 1 mm.

In yet another aspect, provided is a building material selected from drywall, plywood board, insulating panels for use in refrigerators/freezers, shipping containers and construction, comprising any of the insulating materials described herein.

In another aspect, provided is a method comprising: a) providing a plurality of insulating particles with a packing density greater than or equal to 60%; b) depositing or having water on a least a portion of an outer surface of the plurality of insulating particles; and c) reacting at least one type of cyanoacrylate monomer assisted by the water to generate a polymer network, thereby crosslinking the plurality of insulating particles and generating an insulating material; wherein the insulating material has a thermal conductivity less than or equal to 0.1 W/m-K. The packing density may be greater than or equal to 70%, 80%, 90% or, optionally, 95%. The insulating material may have a thermal conductivity less than or equal to 50, 25, 10, 9, 5, 2 or, optionally, 1 mW/m-K.

The at least one type of cyanoacrylate monomer may be provided in a vapor phase, nominally at a temperature above the boiling point for the gas pressure being used.

Suitably, the methods disclosed herein may comprehend molecular layer deposition ("MLD") techniques of the kind known to those skilled in the art for forming a nanoscale film of polymer adhesive on the surfaces of the insulating particles. In a different aspect, therefore, provided is a method of making an insulating material comprising: a) close packing a plurality of hollow capsules into a mold, b) infusing the mold with at least one gas phase precursor that polymerizes to form a polymer adhesive, and c) causing or allowing the monomer to polymerize on the exterior surfaces of the hollow capsules, thereby bonding the hollow capsules together. The methods described herein may be performed under atmospheric or sub-atmospheric pressure. The methods may be performed at elevated temperatures, i.e., above room temperature. The methods suitably comprise surface-controlled reactions, enabling the polymer adhesive to be formed in situ for bonding or cross-linking the hollow capsules together. The cross-linked hollow capsules may thus form a self-supporting form.

The methods may further comprise reacting a strengthening agent, for example a boron-containing strengthening agent as described above with the insulating particles or hollow capsules and polymer adhesive. The methods may further comprise reacting a boron-containing strengthening agent with the cyanoacrylate, the polymer network or a combination thereof. The boron-containing strengthening agent may be provided in a vapor phase. The boron-containing strengthening agent may be co-delivered simultaneously or sequentially with the at least one precursor that forms a polymer adhesive.

The methods may further comprise reacting a Lewis acid or lone pair acceptor like an aluminum-containing strengthening agent with the insulating particles and polymer adhesive. The methods may further comprise reacting an aluminum-containing strengthening agent with the cyanoacrylate, the polymer network or a combination thereof. The aluminum-containing strengthening agent may be provided in a vapor phase.

The methods may further comprise providing at least one type of reinforcing fiber, for example, by mixing the reinforcing fibers with the insulating particles or hollow capsules. The reinforcing fiber may be provided in the mold with the close packed hollow capsules such as hollow glass microspheres. The reinforcing fiber may be chemically bonded to the polymer network, physically bound to the polymer network, contained in a void space between the insulating particles or a combination thereof. The reinforcing fiber may be cellulose, a plant material, a second polymer, glass or a combination thereof.

The method may further comprise coating the insulating particles or hollow capsules with a fluoropolymer as described above, thereby altering the surface hydrophobicity of the plurality of insulating particles or hollow capsules. Suitably, the fluoropolymer may be applied by vapor deposition before or after deposition of the polymer adhesive. Alteration of hydrophobicity may be useful in certain applications, including reducing ice formation which can increase thermal conductivity and reducing degradation of the insulating material when exposed to water, especially at elevated temperatures.

The insulating particles may comprise fumed silica, including fumed silica provided in the interstitial space between other insulating particles. The insulating materials may comprise hollow capsules, including hollow glass microspheres as described above. The insulating material may comprise silica filler particles which are disposed in interstices between the hollow capsules. For example, the silica filler particles including fused silica may comprise greater than or equal to 1% wt, 2% wt., 3% wt., 4% wt .,5% wt., 10% wt., 20% wt., 30% wt., 40% wt., or 50% wt. with respect to the total weight of the composite material. Each of the silica particles may be at least partially covered with a layer of the polymer adhesive which may bond the fumed silica particles to the hollow capsules. The silica particles may comprise fumed silica.

As described above, the hollow glass microspheres may have two or more distinct size distributions, and the method comprises substantially homogeneously mixing the hollow glass microspheres prior to bonding. It will be understood that owing to the size difference(s) between the spheres of respective distributions, multiple microspheres of relatively small size may be disposed within interstitial spaces defined between adjacent microspheres of relatively larger size. The method may further comprise the step of substantially homogeneously mixing the hollow glass microspheres with silica filler particles prior to bonding.

The at least one precursor may comprise at least one homobifunctional precursor which is capable of polymerizing on a surface to form the polymer adhesive. The homobifunctional precursor may comprise an organic molecule with at least two functional groups which can participate in polymerization. The precursors may be selected from one or more of diamines, dienes, diisocynates, diisothiocyanates, dialdehydes, dianhydrides, diols, e.g. glycols, dithiols, dihalides, e.g. dichlorides, di- or tri-alkoxysilanes, and alkylenedioxythiophenes. In some embodiments, two or more homobifunctional precursors may be employed. The at least one precursor may comprise at least one monomer, for example a sequential, self-limiting, surface reacting monomer, which polymerizes to form a polymer adhesive. The at least precursor may polymerise on the surfaces of the hollow capsules to form a thin, generally uniform layer or film of polymer adhesive, as described above. The at least one precursor may polymerize spontaneously. In some implementations, the at least one precursor may polymerize in the presence of another molecule, for example an accelerator, initiator, catalyst and/or one or more additional precursors, to form the polymer adhesive. The accelerator, initiator, oxidant, catalyst and/or additional precursor(s) may be co-delivered simultaneously or sequentially with the at least one precursor, for example in the vapor phase, or it may be naturally present as a component of the surroundings, e.g. water vapor, or it may be provided on the surface of the hollow capsules, for example before or after packing the hollow capsules in the mold. In some implementations therefore the surfaces of the hollow capsules may be modified to form a surface suitable for causing or allowing polymerization of the at least one precursor to occur. The nature of the modification may depend upon the desired chemistry. In some implementations, the at least one precursor may comprise a $C_{1-10}$alkyl cyanoacrylate monomer, for example, methyl cyanoacrylate, ethyl cyanoacrylate, butyl cyanoacrylate, octyl cyanoacrylate or a combination thereof. Particular examples of alkyl cyanoacrylates include methyl 2-cyanoacrylate, ethyl 2-cyanoacrylate, n-butyl cyanoacrylate and 2-octyl cyanoacrylate. Cyanoacrylates may be derived from ethyl cyanoacrylate and related esters. The cyanoacrylate may comprise ethyl 2-cyanoacrylate and octyl cyanoacrylate. The cyanoacrylate monomer may polymerize in the presence of trace amounts of water to form polycyanoacrylate. As mentioned above, water may be present on the exterior surfaces of the hollow capsules as a result of ambient humidity, thereby serving as an accelerator. There may be greater amounts of water in regions where adjacent hollow capsules come into close proximity or contact one another, leading to thicker layers of polymer adhesive in these regions. In some implementations, water vapor may be infused with the monomer, but this may be less preferred in view of the risk of blocking pores between hollow capsules, which may make it difficult for the monomer to penetrate the assemblage completely. In some implementations, the at least one precursor may comprise vinyl acetate, which may polymerize and hydrolyze to form a polyvinyl alcohol. Suitably, the vinyl acetate monomer may polymerize in the presence of an initiator, for example benzoyl peroxide or 2,2'-azo-bis-isobutyrylnitrile (AIBN), which may be co-delivered with the monomer. In some implementations, the at least one precursor may comprise pyrrole or 3,4-ethylenedioxythiophene which polymerize in the presence of an oxidant to form polypyrrole or poly(3,4-ethylenedioxythiophene) ("PEDOT") respectively. Suitable oxidants are iron chloride and iron tosylate, which may be provided on the surface of the hollow capsules prior to infusion with the precursor. In some implementations, 3,4-ethylenedioxythiophene may be polymerized at relatively low temperatures of about 150° C. in the presence of $MoCl_5$ by oxidative MLD. Those skilled in the art will know of other polymer adhesives which may be formed as thin layers in situ on the surfaces of the hollow capsules by vapor phase deposition or molecular layer deposition using one or more precursors, including polyimides, polyazomethines, polyureas, polyamides, polyimide-polyamides, polythioureas, polyethylene terephthalate, and alucones. Polyimides, polyureas, polyamides, poly-imide-polyamides, polythioureas and polyethylene terephthalate for example may be formed in situ by infusing two or more precursor into the mold simultaneously or sequentially, so they react together to polymerize on the surfaces of the hollow capsules to bond the capsules together. Further examples of other molecules which may be reacted with the at least one monomer include iodide catalysts which may be co-delivered in the vapor phase, and iron oxide which may be provided on the surfaces of the hollow capsules by atomic layer deposition after packing in the mold. Additional information regarding useful polymers and vapor deposition may be found in Meng, X. "An overview of molecular layer deposition for organic and organic inorganic hybrid materials: mechanisms and growth characteristic and promising applications" *J Mater Chem A*, 2017, 5, 18326. These additional polymers maybe used in conjunction with cyanoacrylates or as substitutes.

In some implementations, the methods described herein may further comprise forming low-emissivity coating on the hollow capsules. The low-emissivity coating may comprise a thin layer or film of a conducting polymer, for example polypyrrole or PEDOT, as described above. Alternatively, or additionally, the low-emissivity coating may comprise a conducting oxide semiconductor, for example tin oxide, indium oxide, titanium oxide, zinc oxide, boron tin trioxide or a combination thereof. An oxide coating may be applied to the hollow capsules before or after packing in the mold. The oxide coating may be applied to the hollow capsules prior to or after crosslinking with the polymer adhesive. The oxide coating may be formed on the hollow capsules by any suitable technique known to those skilled in the art, for example atomic layer deposition ("ALD").

The methods may comprise coating a surface of said insulating material or particles with a low-emissivity coating. The low-emissivity coating may have a thermal conductivity of less than or equal to 9 W/m-K. The low emissivity coating may have an emissivity of less than or equal to 0.3 of electromagnetic radiation having a wavelength selected from the range of 1 mm to 0.4 µm. Optionally, the low emissivity coating may have an emissivity less than 0.5, 0.4, 0.25, 0.2, 0.15, 0.1, or 0.05. The step of coating may be performed in the vapor phase.

The method may further comprise causing or allowing the vaporized precursor(s) to flow through the hollow glass microspheres in the mold prior to polymerization and bonding. The precursor(s) may be infused under a pressure below or above atmospheric pressure. The precursor(s) may be infused at a temperature above the boiling point of the precursor(s) at the pressure of the infusion process, e.g., atmospheric pressure or above or below atmospheric pressure. Suitably, the method may be carried out at a temperature no higher than about 200° C. to avoid unwanted degradation of organic components, for example the polymer adhesive, and this may constrain the choice of precursor for use in vapor phase deposition of the polymer adhesive to those which exist in vapor phase at the processing temperature and pressure.

In another aspect, disclosed herein is a method for making insulative materials comprising crosslinked vacuum capsules or hollow capsules. In an embodiment, the materials are made using a solution phase processing step. In an embodiment, the materials are made using a vapor phase processing step. In an embodiment, the vapor phase processing uses cyanoacrylate. In an embodiment, the vapor phase processing uses other precursors that can polymerize or form a bond and crosslink the vacuum capsules. In another embodiment, the crosslinked vacuum capsules using a crosslinking composition comprising boron. In an embodiment, a crosslinking composition facilitates the crosslinking of an ancillary crosslinking agent, such as, for example, cyanoacrylate. In an embodiment, the crosslinked vacuum capsules using a crosslinking composition comprising polymers. In an embodiment, the crosslinked vacuum capsules using a crosslinking composition comprising a fiber. In another embodiment, the crosslinked vacuum capsules use a crosslinking composition comprising cellulose.

In an embodiment, the boron forms a stronger chemical bond (versus a typical Van der Waals crosslinking bond) between different components in the structure, e.g., between the crosslinking agent/polymer and the vacuum capsule surface, and/or between the crosslinking agent and strengthening materials like fibers, and/or between the vacuum capsule surface and strengthening agents like fibers.

In an aspect, disclosed herein is an insulative material comprising crosslinked vacuum particles. In an embodiment, the insulative material has a thermal conductivity of less than about 9 mW/m-K. In another embodiment, the insulative material has a thermal conductivity of less than about 1 mW/m-K. In an embodiment, the insulative material has an R value of up to R-80. In an embodiment, the insulative material has an R value of about R-20 wherein the material is about a quarter inch thick (6.35 mm). In another embodiment, the insulative material comprises cyanoacrylate. In an embodiment, the insulative material comprises fluoropolymers, cellulose, boron, and chloromethylsilane. In another embodiment, the insulative material has a vacuum capsule packing density of about 95%.

Other objects, advantages, and novel features of the present invention will become apparent from the following detailed description of the invention when considered in conjunction with the accompanying drawings.

It will of course be appreciated that features described in relation to one aspect of the present invention may be incorporated into other aspects of the present invention. For example, the methods of the invention may incorporate any of the features described with reference to the insulating materials of the invention and vice versa.

DETAILED DESCRIPTION

The embodiments described herein should not necessarily be construed as limited to addressing any of the particular problems or deficiencies discussed herein. References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

Figure 18:
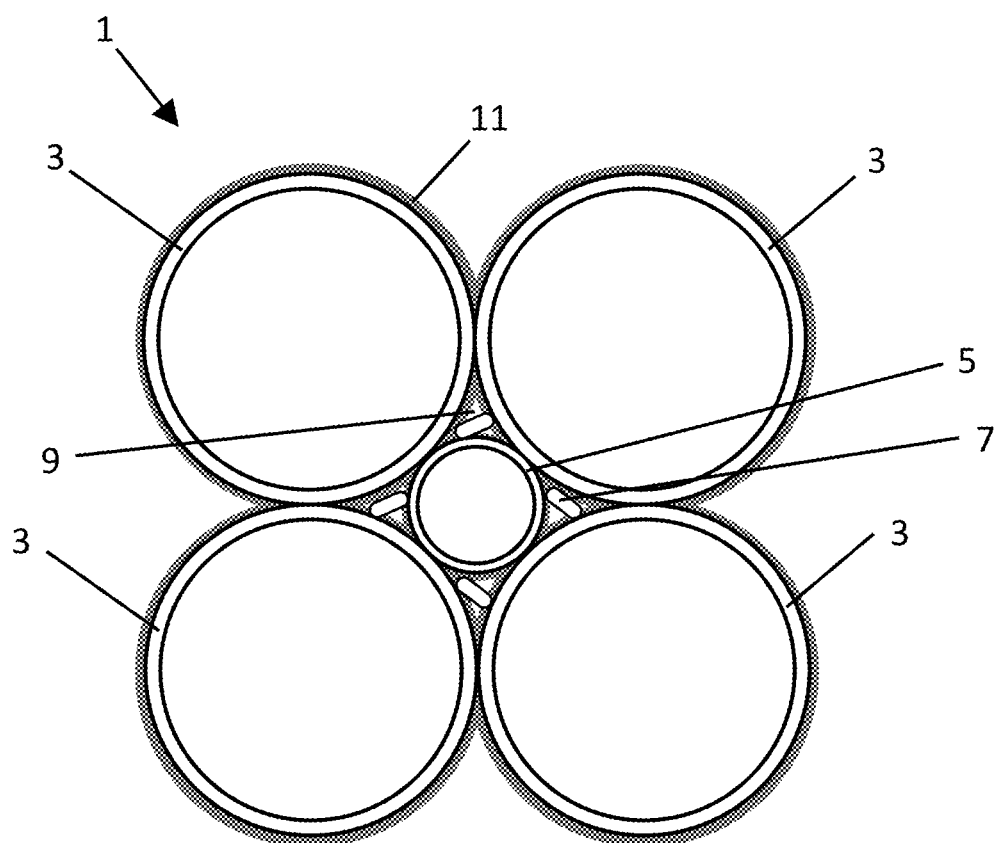
FIG. 18 provides a schematic cross-sectional view of an insulating composite material as described herein.
Figure 19:
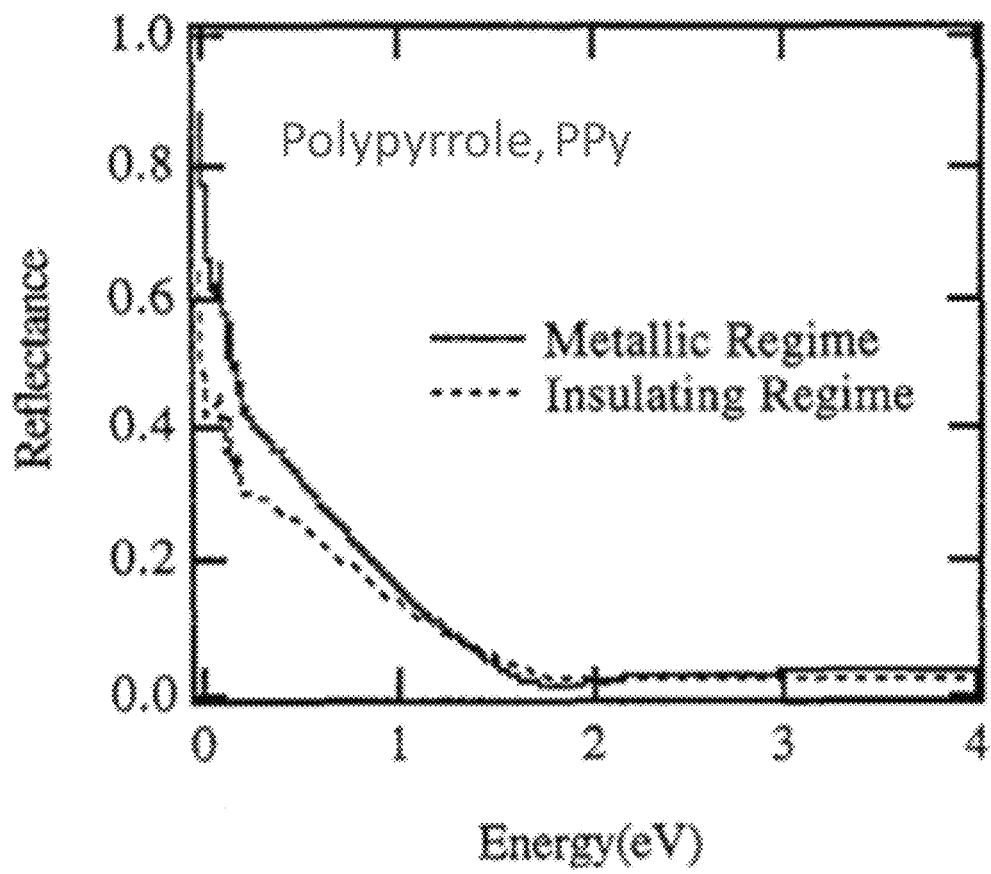
FIG. 19 illustrates the reflectance spectra of polypyrrole in the metallic regime (solid) and in the insulating regime (dotted) at room temperature, showing 25% to 40% reflectivity in the 2.5 μm to 20 μm wavelength range while having lower thermal conductivity than other reflective materials of approximate 0.2 W/m-K.
Figure 20:
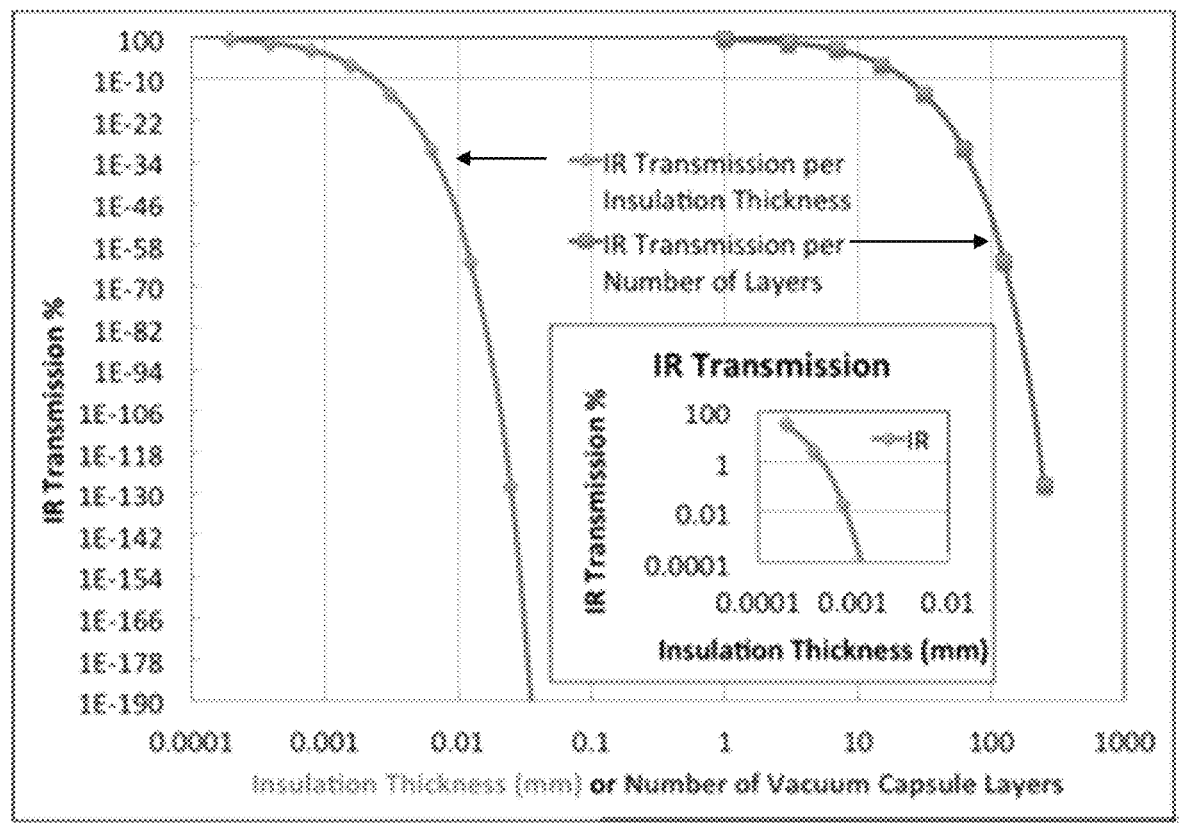
FIG. 20 provides the % of infrared transmission versus the thickness in mm (left) or the number of layers of hollow capsules (right) of the insulating materials described in this invention. Even a layer of approximately 10 coated hollow capsules reduces the IR transmission by 99.9% over the 8 μm to 13 μm wavelength range.

A schematic cross-sectional view of an insulating composite material 1 according to an embodiment of the invention is shown in FIG. 18. The composite material comprises larger hollow glass microspheres (HGMs) 3 having an outer diameter of approximately 120 µm. The larger HGMs 3 define interstitial spaces in which smaller HGMs 5 having an outer diameter of approximately 20 µm are contained. Particles of fumed silica 7 are located in the interstitial spaces 9 between the larger HGMs 3 and the smaller HGMs 7. The HGMs 3, 5 and fumed silica 7 are coated with and held together by a thin layer or film of cyanoacrylate adhesive 11 of approximately 5 to 10 monolayers in thickness, which may be applied in a vapor phase processing step, as described in more detail below. While adjacent HGMs 3, 5 are shown as being in direct contact with one another in FIG. 18, in some embodiments of the invention there may be a layer of adhesive 11 between at least some adjacent HGMs 3, 5 such that the adjacent HGMs are not in direct contact with one another. Furthermore, while the small and large HGMs 3, 5 are shown as having a consistent size, it will be appreciated that in embodiments of the invention the larger and smaller capsules may have a size distribution such that the small HGMs have sizes according to a first size distribution and such that the larger HGMs have sizes selected from a second size distribution. Also, while the cross-linking adhesive layer 11 of the example shown in FIG. 18 comprises cyanoacrylate, in other embodiments of the invention the adhesive layer may comprise one or more other polymers as described above, such as, for example, polyvinyl alcohols, polypyrrole and poly(3,4-ethylenedioxythiophene) ("PEDOT"), polyimides, polyazomethines, polyureas, polyamides, polyimide-polyamides, polythioureas, polyethylene terephthalate, and alucones.

The provided discussion and examples have been presented for purposes of illustration and description. The foregoing is not intended to limit the aspects, embodiments, or configurations to the form or forms disclosed herein. In the provided Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed herein. This method of disclosure is not to be interpreted as reflecting an intention that the aspects, embodiments, or configurations require more features than are expressly recited in each claim. Rather, as the following claims reflect, inventive aspects lie in less than all features of a single disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

Methods

EXAMPLE 1

Vapor Phase Processing

Approximately 100 g of hollow glass microspheres made of soda-lime borosilicate glass are separated by sizes using a set of standard sieves. Suitable hollow glass microspheres are commercially available from 3M® under the trade name K1. It will be appreciated that other suitable hollow glass microspheres may be used, made from the same or different kinds of glass or other materials. The hollow glass microspheres comprise thin-walled hollow capsules (i.e., having a wall thickness less than or equal to 10% of the total diameter of the capsule). The hollow glass microspheres are sieved to separate capsules having different size distributions. Larger capsules, having diameters larger than 125 micron in size (approximately 85% by mass), are then recombined with smaller capsules, having a 20 to 38 micron diameter size distribution (approximately 15% by mass). In other embodiments, a different population of hollow capsules, having a size distribution of less than 10 micron in diameter (again approximately 15% by mass), may alternatively or additionally be used. In embodiments where 3 or more size distributions are included, the mass ratios may be adjusted accordingly, for example, approximately 74%/13%/13% by mass, respectively. The larger and smaller capsules are thoroughly mixed using a planetary mixer to provide a capsule mixture with 80% packing density as measured with a pycnometer. In other embodiments of the invention a rotating drum mixer, or any other suitable type of mixture may be used. Approximately 13% by mass of fumed silica (Sigma S5130) is used to fill in the interstitial spaces between the capsules. It will be understood that in other embodiments of the invention, where a higher packing density of capsules is used, the interstitial volume between the capsules decreases, and thus amount of fumed silica required to fill that volume also decreases. In other embodiments of the invention, other types of insulating particles as described herein, such as vermiculite or pearlite, can be used alternatively or additionally to silica. Furthermore, in some embodiments, approximately 1% by mass of cellulose fibers having lengths of the order of hundreds of microns can also be added to the mixture to provide additional stiffness and strength to the resulting insulating material. In this case, the fumed silica is mixed in with the capsules using a roller mixer for approximately 1 hour, and then the capsule and fumed silica mixture is placed on a porous substrate, in this case filter paper, in a mechanical press die and pressed to approximately 200 psi (1.38 MPa). In other embodiments of the invention other suitable porous substrates maybe used.

The vapor phase processing takes place in air at atmospheric pressure. In other embodiments of the invention nitrogen or other gasses may be used instead of or in combination with air.

To provide additional strengthening of the resulting insulating material, boron trichloride is fumed through the mixture at room temperature. In other embodiments of the invention triisopropyl borate heated to 150 Celsius may alternatively or additionally be fumed through the mixture as an alternative or additional strengthening agent. The borate strengthening agent may provide addition chemical bonds between the hollow capsules and the polymer or between multiple hollow capsules in close proximity.

Then ethyl-cyanoacrylate heated to 100 Celsius is fumed through the mixture. This vapor phase processing step provides an adhesive layer or film having a substantially uniform thickness of approximately 10 monolayers of polymer upon the outer surfaces of the capsules and fumed silica. The ethyl-cyanoacrylate adhesive layer cross-links the capsules to provide a self-supporting insulating material as described herein having a measured thermal conductivity less than 9 mW/m-K. It will be appreciated that in other embodiments of the invention, any suitable polymer, such as those polymers described herein, can be fumed through the mixture in the vapor phase to provide the adhesive layer.

Additional radiative reflecting and hydrophobicity coatings can be applied subsequently to the step of cross-linking the spheres using the polymer adhesive, if desired. Standard conducting oxide layers like tin oxide can be formed by fuming 50 Celsius heated tetrakis(dimethylamino) tin through the sample. Alternatively, 50 Celsius heated iodide followed by 130 Celsius heated pyrrole can be fumed through the sample to create a radiative reflective coating. Less than 5% by mass should be added to the sample with the radiative reflective coating. Less than 1% by mass of 130 Celsius heated trimethylaluminum or 100 Celsius heated trimethylchlorosilane can be fumed through the sample to make the surfaces more hydrophobic. Alternatively, or in addition, 75 Celsius heated 1H,1H,2H,2H-Perfluorodecyl methacrylate (PFDMA) can be fumed through the sample to increase hydrophobicity. Because these hydrophobicity coatings should be a single monolayer, much less than 1% should be added to the sample mass. Hydrophobicity may be beneficial for various applications of the insulating material, for example, by reducing ice formation or meeting industry standards for various applications.

In other embodiments of the invention, the capsules may be evacuated prior to cross-linking by, for example, treating the capsules at temperatures of up to approximately 600° C. for up to approximately 40 minutes under vacuum, before cooling the capsules and then returning them to atmospheric pressure.

EXAMPLE 2

Solution Phase Processing

For solution phase processing, acetone or another wetting agent is added to the mixture of capsules and fibers in a sufficient amount to wet all the materials. Ethanol or methanol is used as a solvent for the crosslinking agents and boron strengthening chemical. Here, 1% by sample mass of boric acid and 10% by mass of cyanoacrylate is added to sufficient solvent to completely cover the sample. For example, if the sample is 75 mm diameter and 6 mm thick, then approximately 25 cubic centimeters of solvent is used. The solvent/crosslinking mixture is added to the sample and then the solvent evaporates or is more rapidly removed by freeze drying. Trimethylchlorosilane solution can be added to the sample when partially dried to make the surfaces more hydrophobic.

By their nature, highly insulating materials have multiple components working together to limit thermal conduction, convection, and radiative transport. Many thermal conductivity measurement techniques that assume uniform homogeneous boundaries do not work properly for highly porous materials that are in contact with air than any solid material. In addition, thermal conductivity measurements of highly insulating materials are severely impacted by thermal leaks from the ambient environment. Thus, the main measurement methods typically use steady-state thermal transmission involving thermally "guarded" sensors and often require large sample areas so that edge effects and heat leaks are minimized. Standard "guarded hot plate" heat flow meter based systems (e.g., Fox 600, https://www.tainstruments.com/ghp-600/) performs standard ASTM C518 (Standard Test Method for Steady-State Thermal Transmission Properties by Means of the Heat Flow Meter Apparatus) tests that require relatively large samples (i.e., ~1 meter by ~1 meter). Other measurement standards include ISO 8301:1991 (Thermal insulation—Determination of steady-state thermal resistance and related properties—Heat flow meter apparatus) and DIN EN 12667 (Thermal performance of building materials and products—Determination of thermal resistance by means of guarded hot plate and heat flow meter methods—Products of high and medium thermal resistance). With large enough samples, these heat flow meter type systems typically have measurement capabilities to approximately 0.001 W/m-K. For smaller samples and sensitivities below 0.0001 W/m-K, calorimetry based methods (https://www.cryotek.com/) provide absolute thermal conductivity measurements on samples less than 8 inch diameter and less than an inch thick using steady-state thermal transmission techniques. While the standard guarded hot plate systems are typically more appropriate for higher temperature (ambient temperature and above) thermal conductivity measurements, the calorimetry systems can provide accurate cryogenic temperature measurements.

Crosslinked Vacuum Capsules

Disclosed herein are methods for using vacuum or near vacuum capsules and other particles for making novel insulative materials that have a permanent vacuum inside the capsules that does not degrade significantly with time. In an embodiment, glass, plastic and other microbubbles or capsules can be evacuated by applying a vacuum at a temperature range over a period of time. In an embodiment, the glass, plastic and other microbubbles disclosed herein are evacuated by using temperature programmed desorption processes in which the gasses initially present in the interior of the microbubbles escape through pores during the evacuation process. In an embodiment, the microbubbles are treated at temperatures up to 600° C. In another embodiment, microbubbles are treated at temperatures up to about 400° C. In an embodiment, microbubbles are treated at temperatures up to about 400° C. or up to about 600° C. for about 20 to 40 minutes under vacuum. After the microbubbles have undergone this process, they are cooled and returned to atmospheric pressures. As a result of this processing, a vacuum now exists within the microbubbles. The microbubbles can also be directly manufactured with vacuum inside. The vacuum can be maintained for very long periods of time, as long as the integrity of the shells of the evacuated microbubbles ("vacuum capsules") remains intact. The very low mass of the capsule shells has limited thermal conductivity and results in very lightweight (capsule and insulation densities perhaps 0.005 g/cc to 0.2 g/cc) and highly insulating (greater than R-70 per inch thickness) materials. However, the micrometer sized capsules used are highly dispersible powders that are difficult to handle and require supportive structures to contain the powders in order to fully realize the insulative properties. As disclosed herein, vapor phase cross-linking of loose, insulating, evacuated microbubbles, capsules and/or particle powders results in inexpensive (from $0.5 to $2 per square foot, for example) solid and potentially flexible insulating structures that can be handled and treated in a manner similar to many commercially available rigid foam insulations. Alternatively, solution phase processing may also be employed.

Crosslinked particles used for insulation applications created using existing methods have limited structural strength because point contacts between the particles provide a limited surface contact area for bonding. Another cause of limited strength is that there may be few crosslinking sites on any given particle. This results in a limited surface contact area being available for crosslinking. In many of the insulative materials, the structural strength comes only from nearest neighbor particle to particle connections. For example, the crosslinking may only involve weak bonding like that offered through van der Waals bonds or other weak forces.

Vapor phase approaches to crosslinking vacuum capsules help to maintain optimal packing densities achieved through careful mixing of multimodal particle sizes, and the intrinsic shape and structure desired. Vacuum capsules and other particles disclosed herein can be crosslinked using vapor phase processing to reduce the effective thermal conductivity of the resulting insulating materials compared to embedding the vacuum particles in polymer or ceramic matrices. In an embodiment, vapor phase processing of vacuum capsules includes the use of chemical vapors that are transported through small pores between the particles wherein deposits are made or produced of very thin (perhaps angstrom or nanometer thick or at a monolayer scale, e.g., 1-20 monolayers) materials at the point contacts and on the surfaces of the particles. These very thin materials can include polymers and other thin film coatings which can be used to crosslink the particles to create solid structures out of the loose powders, while leaving most of the voids between the particles filled with air, other gases, or vacuum if the particles are placed in an evacuated container. The reaction to form the very thin materials can be controlled in a number of ways such that the crosslinking and other properties are achieved at specific locations on the particles. In an embodiment, at atmospheric or slight vacuum pressures, organic or metal-organic precursors within a range of appropriate vapor pressures can be used to deliver crosslinking precursors through the small pores between and onto the surfaces of the vacuum capsules and other particles disclosed herein.

The methods disclosed herein to make insulative materials from vacuum capsule powders through crosslinking the particles to form porous solids can be modified to create a variety of insulative materials depending on the desired properties and applications. These processing methods can be used to form solid insulation in place or in complex forms. For forming solid insulation within complex forms, particles are poured into a space within a complex design and then are solidified via thin film deposition processing to create in-situ solid insulation of the exact shape of the form. The processing of the vacuum capsules and other particles disclosed herein can also be used to form solid standalone insulation that can be rigid or flexible with structural strength similar to known foam insulating materials. The materials created using methods disclosed herein can be integrated with other materials such as paper, oriented strand board, wood, metal, and ceramics. In an embodiment, the crosslinking vapor either passes through porous materials like paper or integrates with non-porous material via transport through the pores between the particles. The resulting materials may be made by using standard manufacturing approaches such as roll-to-roll and continuous assembly processing at atmospheric or near atmospheric conditions.

In an embodiment, highly dispersive microbubble, vacuum capsules and other insulative particles can be glued or bonded together to impart novel properties to the resulting insulative materials. Through the selection of the crosslinking material, the connections between microbubbles or other insulative particles disclosed herein can be flexible so that the insulation can be bent or rolled without damaging the overall structure. This is in contrast to ceramic insulative particles that are sintered and therefore result in insulative materials that are very rigid and brittle. Insulative materials made using methods disclosed herein are capable of being nailed, screwed, cut and adhered to boards and papers without losing their structural integrity or substantially effecting the superior insulative properties of the material. In an embodiment, the contact area between adjacent vacuum capsules is minimized in the insulative materials made using methods disclosed herein.

As disclosed herein, the very thin and limited amount, for example, monolayer scale of the crosslinking material used to create the vacuum capsule insulated materials should not increase the effective thermal conductivity substantially, and in certain embodiments can decrease the effective thermal conductivity of the insulating material. For example, if organic polymers are used to perform the crosslinking, their thermal conductivities are typically much lower than that of ceramics, and they may also substantially impede phonon transport along the particle surfaces resulting in Kapitza based impedance that lowers thermal transport along the functionalized polymer backbone. In another embodiment, three dimensional deposited branched polymers can be processed to induce the formation of hollow cavity structures on the surfaces of the particles. If these cavities are small enough, they may induce the Knudsen effect which reduces the thermal conduction of the air adjacent to the microbubbles and thus reduces the overall effective thermal conductivity of the vacuum capsule insulated materials.

Often a catalyst (e.g., iron chloride or iron oxide) is needed to facilitate a chemical polymerization or adhesion reaction. In an embodiment, a catalyst was pre-deposited on vacuum capsules and other particle surfaces disclosed herein prior to the vapor phase processing. In an embodiment, a catalyst such as water, iodine, iron oxide or iron chloride is reacted with the vacuum capsules and other particles disclosed herein to adhere to the particle surfaces. The resulting particle surfaces are then reacted with a precursor or other chemical entity that is already present or introduced into the system. The reactions may be similar to various chemical vapor or atomic layer deposition processes.

In an embodiment, a vapor phase method that uses cyanoacrylate monomers is disclosed to make insulative materials from vacuum capsules and other particles. Cyanoacrylates can be fumed at relatively low temperatures (typically from about 100° C. to 200° C. at RTP) to create a vapor that transports through the small pores between the vacuum capsules and other particles disclosed herein and reacts with condensed water on the surfaces of the particles. At the particle surfaces, the cyanoacrylate polymerizes using the water. In an embodiment, water is provided from humidity in the air which may accumulate at the point contacts between particles where crosslinking then occurs.

A thin layer of water is present on the particle surfaces in air, and when the vapor phase processes are used as disclosed herein, a thin polymer film may form uniformly over part or all of the entire particle surface which may result in a strengthening of the particle shells. The resulting particle shells form stronger particle-particle crosslinking of a solid insulating structure that reduces thermal conductivity of the entire structure.

In another embodiment, water can be introduced into the crosslinking process as a vapor through the pores between the particles which remain open and filled with air which has superior insulative properties when compared to most solid materials. In yet another embodiment, if placed in a secondary enclosure, this inter-particle space can be evacuated to further increase the insulative properties of the resulting material. Without being limited by theory, because the geometry of the assembly and resulting resistance to compressive forces of the of the vacuum capsules and other particles disclosed herein, the crosslinked materials made with these particles exhibit increased resistance to shearing forces when compared to the crosslinking material itself.

In an embodiment, hydrophobicity or hydrophilicity of the vacuum capsules or other particles disclosed herein can be adjusted by selectively treating the particles before or after crosslinking. In an embodiment, fluoropolymers are introduced into the insulative materials disclosed herein. In an embodiment, a single layer of fluoropolymer containing composition can be used as a vapor phase or solution phase coating or other surface treatment for the vacuum capsules and other particles disclosed herein. In an embodiment, an alumina containing composition can be used to increase hydrophobicity as a vapor or solution phase coating or other surface treatment for the vacuum capsules and other particles disclosed herein. In an embodiment, a chloromethylsilane containing composition can be used to increase hydrophobicity as a vapor phase coating or other surface treatment for the vacuum capsules and other particles disclosed herein. In an embodiment, cyanoacrylate comprising about 60% ethyl 2-cyanoacrylate and about 30% octyl cyanoacrylate is used to crosslink the vacuum capsules and other particles disclosed herein. In an embodiment, insulative materials made using the methods disclosed herein exhibit an R value of R-20 with a thickness of about a quarter of an inch. In an embodiment, insulative materials made using the methods disclosed herein exhibit an R value of up to R-80.

The number and volume of air gaps between the particles can be adjusted by using vapor phase processing methods disclosed herein to crosslink loose particles of different size distributions in powders to form solid composite materials. The number and volume of the air gaps between the particles can be altered depending on the desired application and properties of the resulting insulative material.

The material strength of the vacuum capsules and other particles disclosed herein may be increased without a substantial increase in their thermal conductivity by both increasing the amount of crosslinking between the particles of while maintaining a small contact area and through multiple long-range particle connections using materials that have high tensile strengths. In an embodiment, fibrous materials with low thermal conductivities having high length-to-diameter ratios are used to provide multiple long-range particle connections. In an embodiment, cellulose fibers are used. Cellulose fibers can have diameters in the nanometer range, but lengths in the hundreds of microns to millimeter or longer range. Cellulose fibers also have relatively low thermal conductivity, but tensile strengths typically much higher than that of ceramic particles or the polymers used for crosslinking.

While cellulose and other fibers can be crosslinked to the particles in the same manner as the particles to each other, boron can be used in order to increase the strength of the crosslinking bonds between the different particles and fibers. In an embodiment, various additional elements and compounds can be used in order to increase the strength of the crosslinking bonds between the different particles and fibers, including, but not limited to, zirconates and aluminum sulfates. By having boron present during the crosslinking process, stronger bonds and therefore stronger insulative structures are formed. In an embodiment, boric acid can be used in solution processing to create the insulative materials disclosed herein. In an embodiment the solution processing can use acetone, methanol, ethanol or water. The use of boron or other Lewis acids (e.g., Aluminum) in the methods disclosed herein increases the strength of the porous solid materials formed with cyanoacrylate used as a crosslinking agent, with or without fiber, at any packing density. In an embodiment, boron containing agents may be used in vapor phase processing including agents such as triisopropyl borate and boron trichloride.

Figure 3:
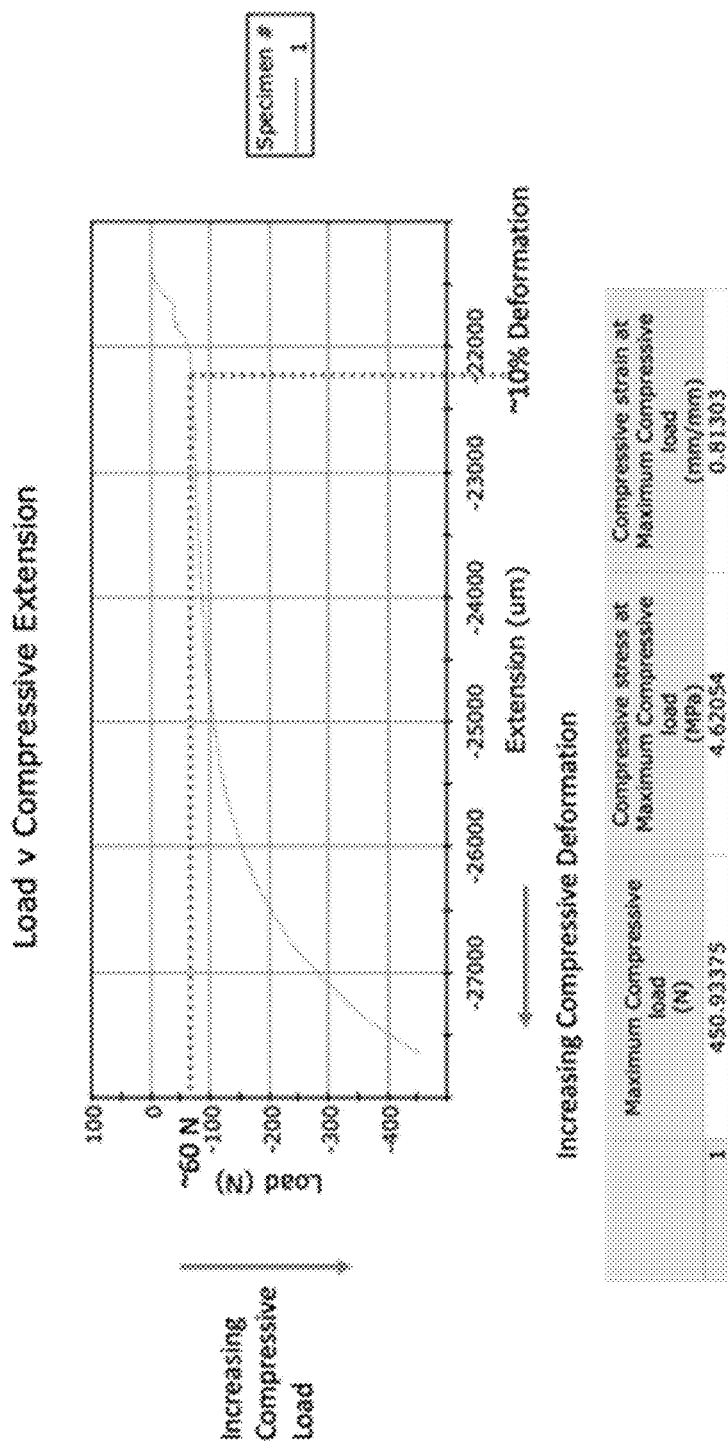
FIG. 3 depicts load vs. compressive extension of an exemplary insulative material made using methods and materials disclosed herein.

Examples of maximum compressive shear stress of various insulative materials made using methods disclosed herein include: 0.11 MPa for a sample made using 3M® K1 insulating capsules, Loctite 4902, acetone, and ethanol; 0.12 MPa for a sample made using K1, L4902, acetone, ethanol, and boric acid; 0.21 MPa for a sample made using K1, L4902, acetone, ethanol, boric acid, and cellulose; 0.41 MPa for a sample made using K1, L4902, acetone, ethanol, boric acid, and 3× cellulose; and 0.45 MPa for a sample made using K1, n-Butyl, acetone, ethanol, boric acid, and 3× cellulose. In an embodiment, using boron and cellulose fiber increases the vacuum capsule crosslinking and the mechanical strength of the insulation. In an embodiment, and as depicted in FIG. 3, insulative materials made using methods disclosed herein using K1, L4902, acetone, ethanol, boric acid, and 3× cellulose exhibit about 72 psi compression strength at about 10% deformation.

In an embodiment, multiply sized particles (gaussian distribution from ~0.005 mm to ~0.13 mm with an average of ~0.065 mm) with effective thermal conductivities lower than that of air can be used to increase the packing density of vacuum capsules and other particles disclosed herein and thus reduce the amount of air in a resulting matrix. Similarly sized spherical particles typically have a packing density less than 60%, with over 40% of the bulk being air between the particles. Mixing different sized spherical particles with each other at the appropriate ratios can create packing densities of over 95%, with less than 5% air between the particles. Thus, the overall effective thermal conductivity of a structure made from packing differently sized vacuum capsules and other particles disclosed herein is reduced while at the same time providing more point contacts between the particles to increase the strength when crosslinked. In an embodiment, packing densities over 95% are achieved by mixing different sized spherical particles including vacuum capsules and other particles disclosed herein. The resulting material is then processed by using methods disclosed herein to create insulative materials having very low thermal conductivity and other improved characteristics.

Examples of measured thermal conductivities (TC) of various insulative materials are depicted in Table 1 where FS is fumed silica, 3M® K1 are 3M hollow glass spheres with a density of about 0.125 g/cc, Eccospheres® are hollow glass spheres made by Trelleborg, Calif. is cyanoacrylate, and evac stands for evacuated.

TABLE 1

| Sample Description | Measured TC (mW/m-K) |
|---|---|
| Air | 36.7 |
| NIST Fibous Glass Board NIST 1450d | 19.6 |
| NIST FS 1449 | 13.4 |
| Pressed FS5130 | 14.7 |

TABLE 1-continued

| Sample Description | Measured TC (mW/m-K) |
|---|---|
| 60% FS5130, 40% 3M I30K (0.6 g/cc) | 29 |
| 3M K1 | 24.9 |
| Eccospheres | 21.5 |
| 85% FS5130, 15% Eccospheres | 11.2 |
| 85% FS5130, 15% Evacuated Eccospheres | 8.8 |
| 85% FS5130, 15% Evac Ecco, 1.5 Hr CA vapor | 13.0 |

Figure 1:
FIG. 1 depicts an image of pressed fumed silica/hollow capsules after vapor deposition of cyanoacrylate using methods disclosed herein.
Figure 2:
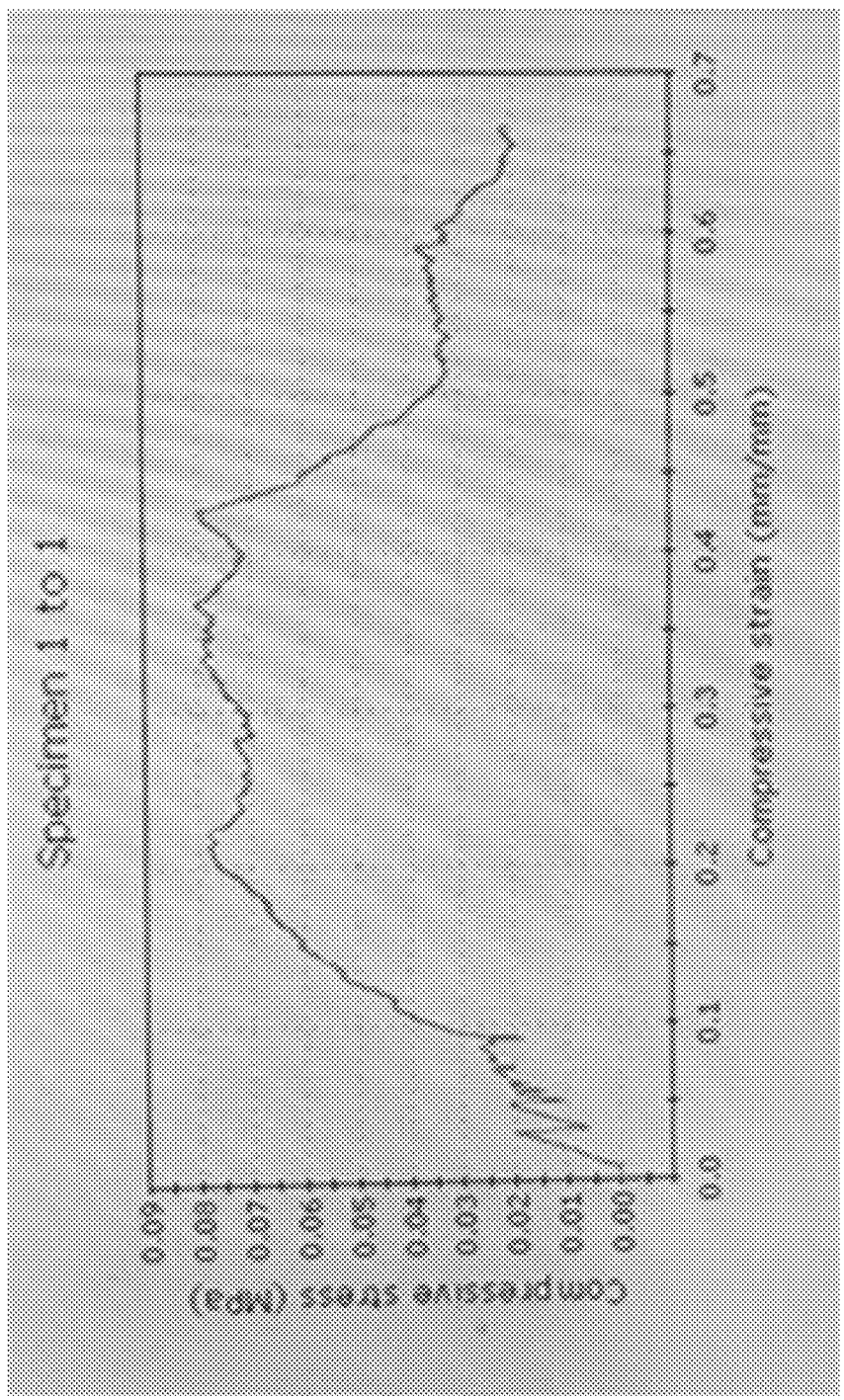
FIG. 2 depicts compressive stress vs. compressive strain of an exemplary insulative material made using methods disclosed herein.

FIGS. 2 and 3 depict compressive stress vs. compressive strain (using solutions of 3M K1 insulating capsules, Loctite 4902, acetone, and ethanol) and load vs. compressive extension (using K1, L4902, acetone, ethanol, boric acid, and 3× cellulose) of an exemplary insulative material made using methods and materials disclosed herein. As can be seen from the mechanical properties of the insulative materials, their robust properties allow for them to be used in various construction materials. The insulative materials can also be used to provide mechanical support to the construction materials that they are integrated within.

Figure 4:
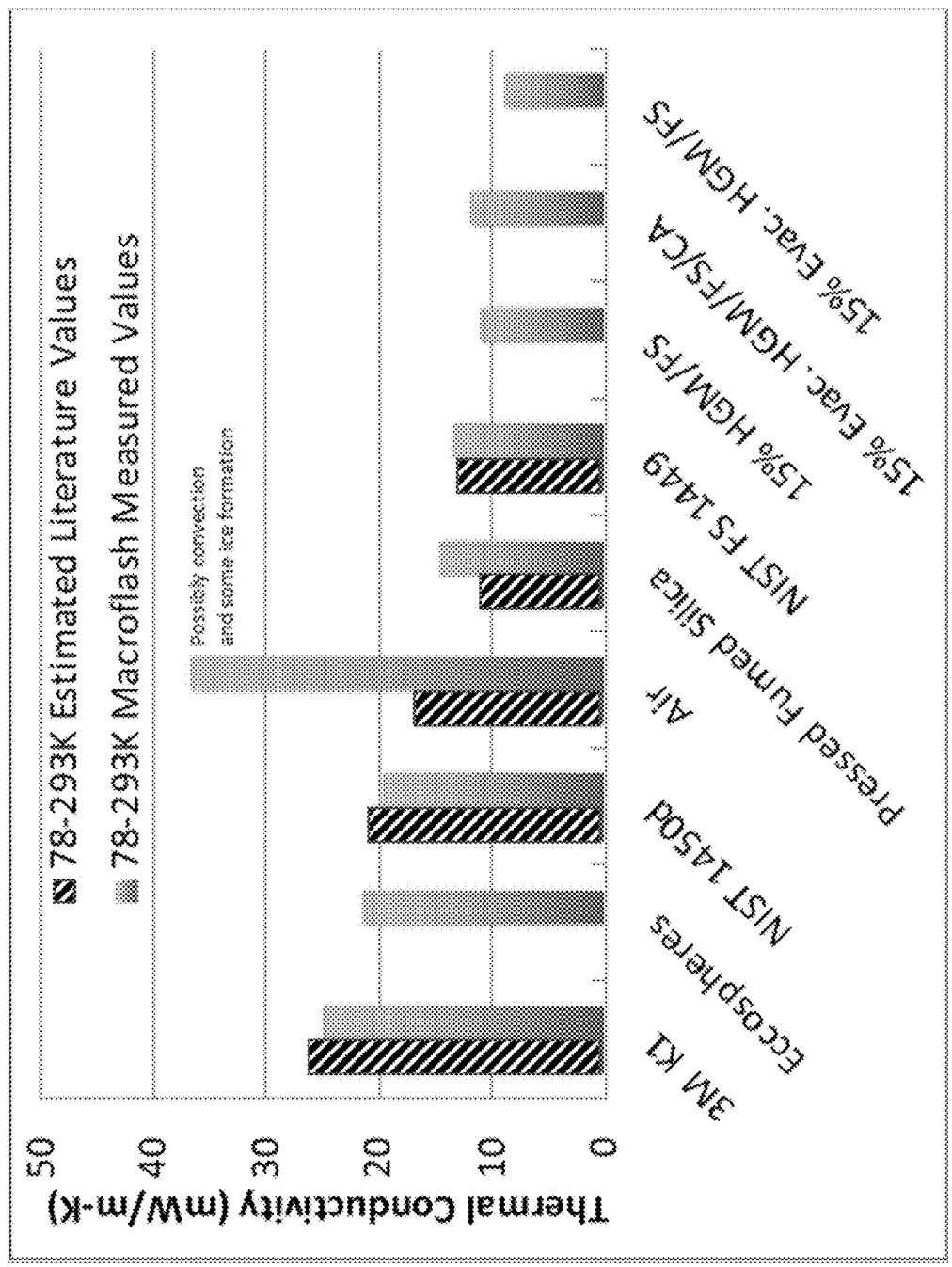
FIG. 4 depicts estimated thermal conductivity literature values (striped) and macroflash measured values (solid) of 3-inch (76.2 mm) diameter and 0.25 inch (6.35 mm) thick insulation materials over a temperature range of from 78 to 293K. As depicted in FIG. 4, FS is fumed silica, 3M® K1 are 3M hollow glass spheres, Eccospheres® are hollow glass spheres made by Trelleborg, Calif. is cyanoacrylate, HGM stands for hollow glass spheres, and evac stands for evacuated.

FIG. 4 depicts the estimated thermal conductivity literature values (striped) and macroflash measured values (solid) of 3-inch (76 mm) diameter and 0.25 inch (6.35 mm) thick insulation materials (Table 1) over a temperature range of from 78 to 293K. In combination with the data presented in Table 1, the measured thermal conductivities of the insulative materials made using methods disclosed herein are demonstrably superior to existing materials.

Thermal Testing of Crosslinked Particle Insulation

Development of highly insulating materials is needed to reduce U.S. energy consumption in nearly every economic sector, and thus will create U.S. jobs in nearly every economic sector from installation of such materials in buildings, vehicles, appliances, cryogenic equipment, and industrial processes. Even today with all the different insulation technologies available, revolutionary developments in insulation are needed and could reduce our energy use by several quads. Imagine the U.S. manufacturing jobs and, ultimately, reduction of energy for heating and air conditioning that could be accomplished with a thin, inexpensive, and flexible highly-insulating material that contains only 5% to 15% air with no external encapsulant, and yet has such a flexible form factor that it is applicable to all kinds of applications. Present commercial insulation is typically limited by the thermal conductivity (TC) of air that in general fills most of the volume. Vacuum insulated panels (VIP) may surpass the air TC limit if a sufficient vacuum (~$10^{-6}$ torr) can be held indefinitely. However, the VIP vacuum degrades relatively quickly (within a few years), is easily punctured, and VIPs are expensive, rigid, and must be pre-assembled to specific sizes/shapes. Thus, while VIPs have the potential to save quads of energy, their present DOE "SCOUT" estimates indicate that VIPs will only address a small fraction due to their high cost and installation challenges. Therefore, there is a substantial need to develop a low cost, high R-value insulation with "flexible" form factors for diverse applications.

Figure 5:
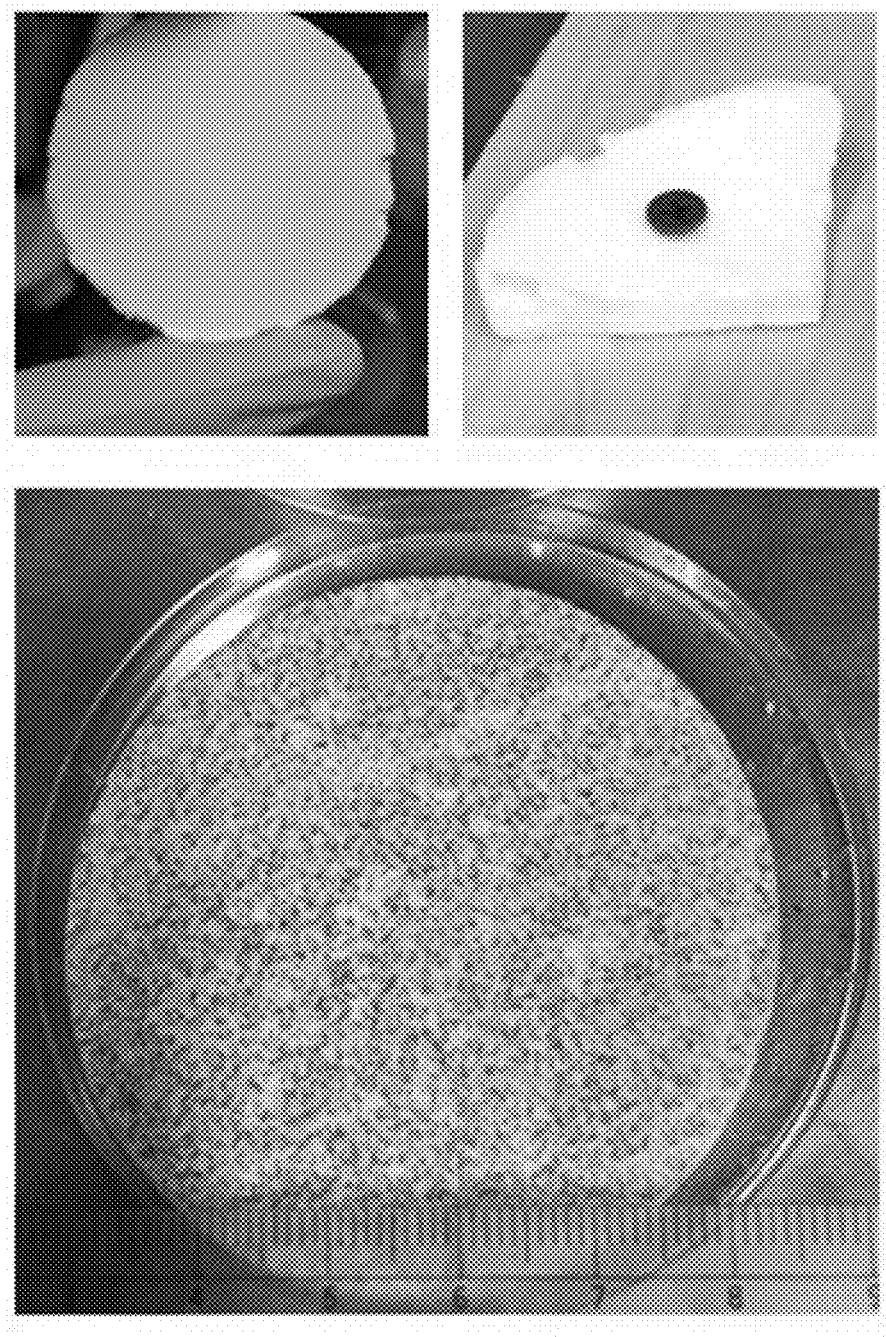
FIG. 5 provides examples of solid insulative materials as described herein (top left) that can be attached to a piece of wood with a screw (top, right). Crosslinked nanoporous lightweight (<0.1 g/cc) solid disk superinsulation with ~30% of the volume being vacuum held in vacuum capsules and ATC<0.01 W/m-K (bottom).
Figure 6:
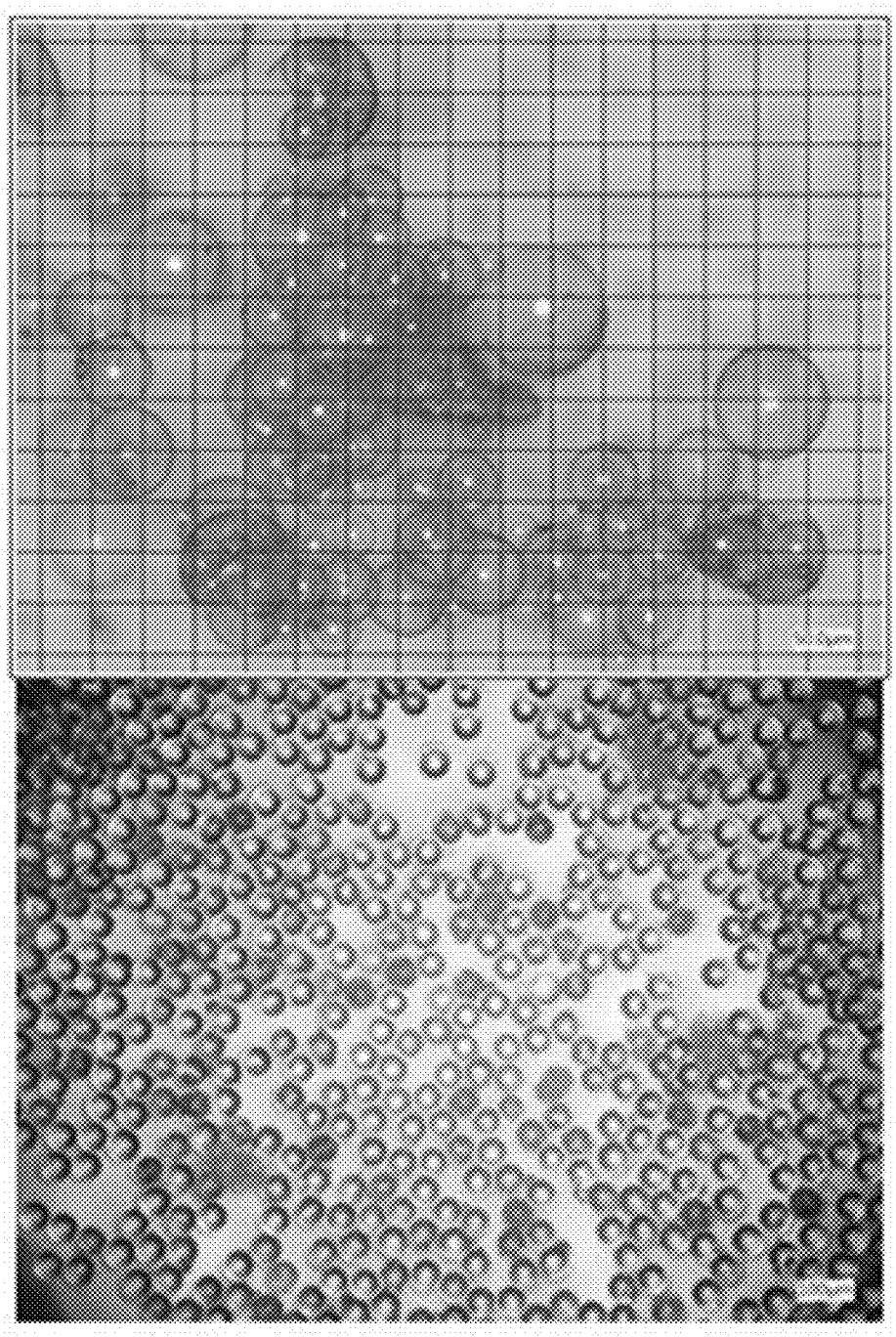
FIG. 6 provides an example of hollow glass microspheres, including use of two different sphere sizes. Initial studies include size ratios of 13:1 and 4.5:1 with respect to the diameter of the larger sphere as a ratio to the smaller sphere.
Figure 7:
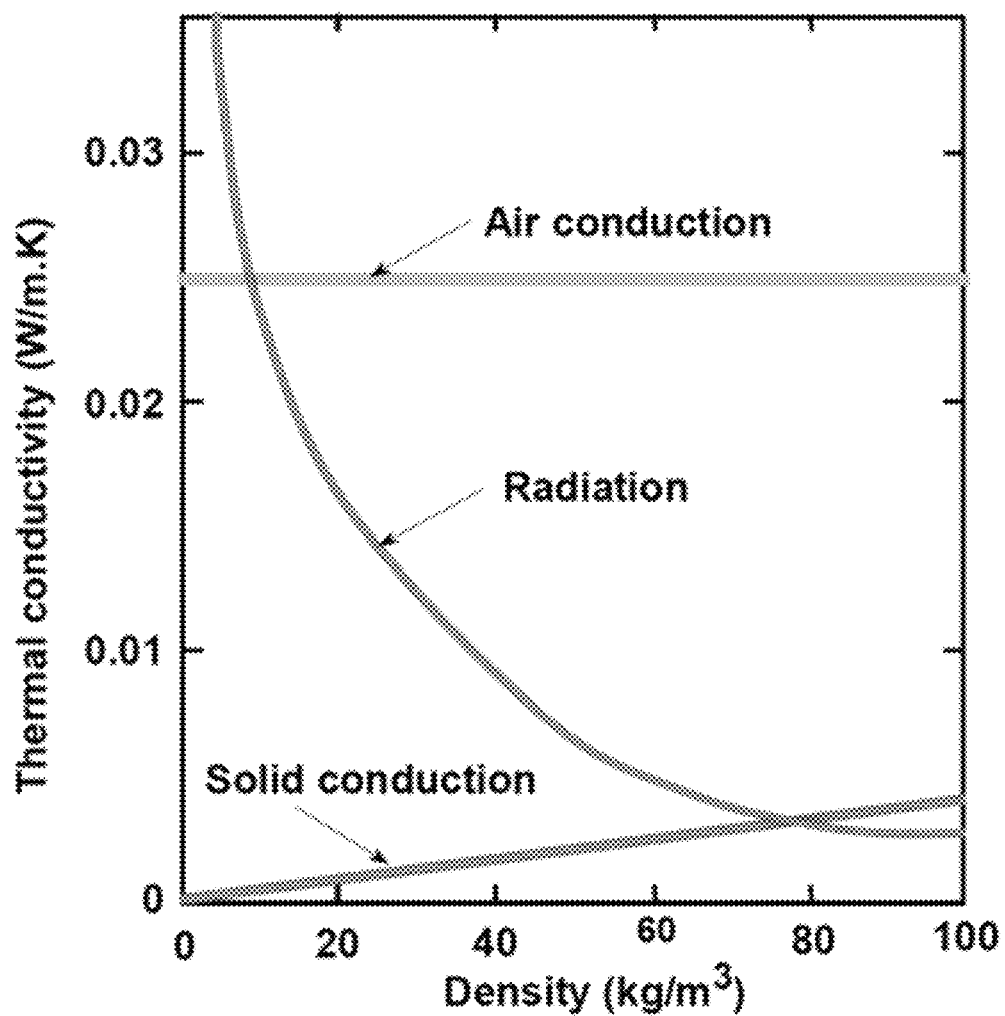
FIG. 7 illustrates the various factors that contribute to thermal conductivity of an insulating material. Generally, convection is not applicable with micron scale spaces. Conduction through air and capsule components may be influenced by air infiltration, air intrusion and moisture accumulation. Radiation at room temperature may be larger than conduction through capsules and/or air.
Figure 8:
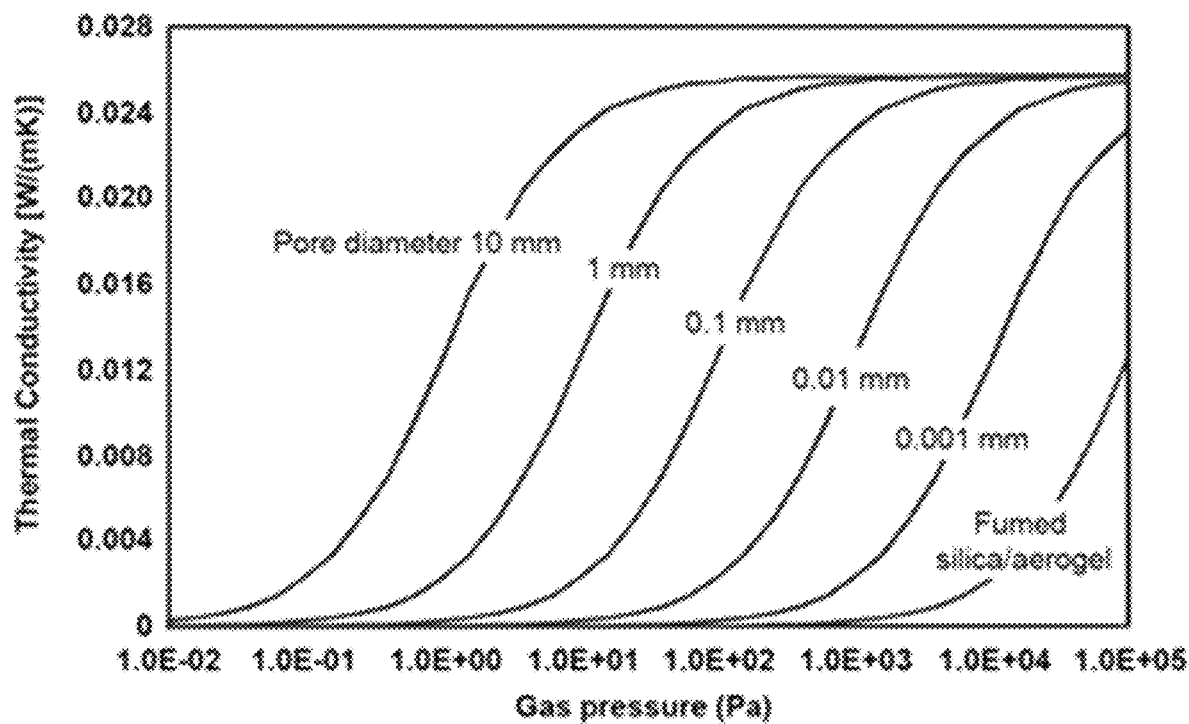
FIG. 8 illustrates changes in thermal conductivity due to pore size. Solid fibrous components generally have pores 2-5 nm in diameter. Air in pores smaller than 1 μm in diameter have lower thermal conductivity. Smaller pores have lower thermal conductivity at higher vacuum pressures, illustrating that air conductivity is less in the nanopores than the macropores.
Figure 9:
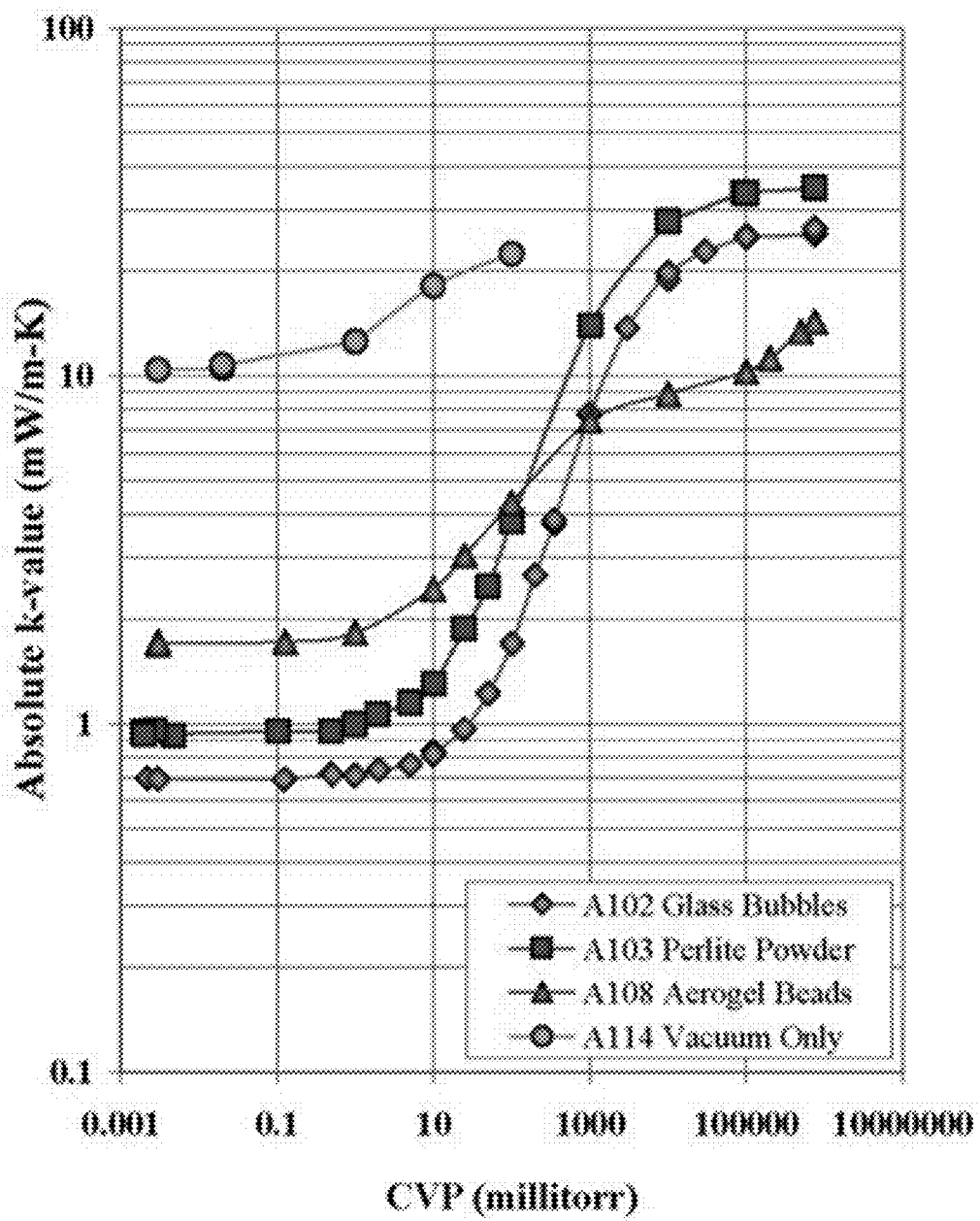
FIG. 9 illustrates that radiative transfer may play a significant role in total thermal conductivity. Thermal model assumptions may overestimate solid conduction contribution and underestimate radiative transfer. Wall thickness may not be a major factor, because conduction through solid components may be bottle necked at small contact points.
Figure 10:
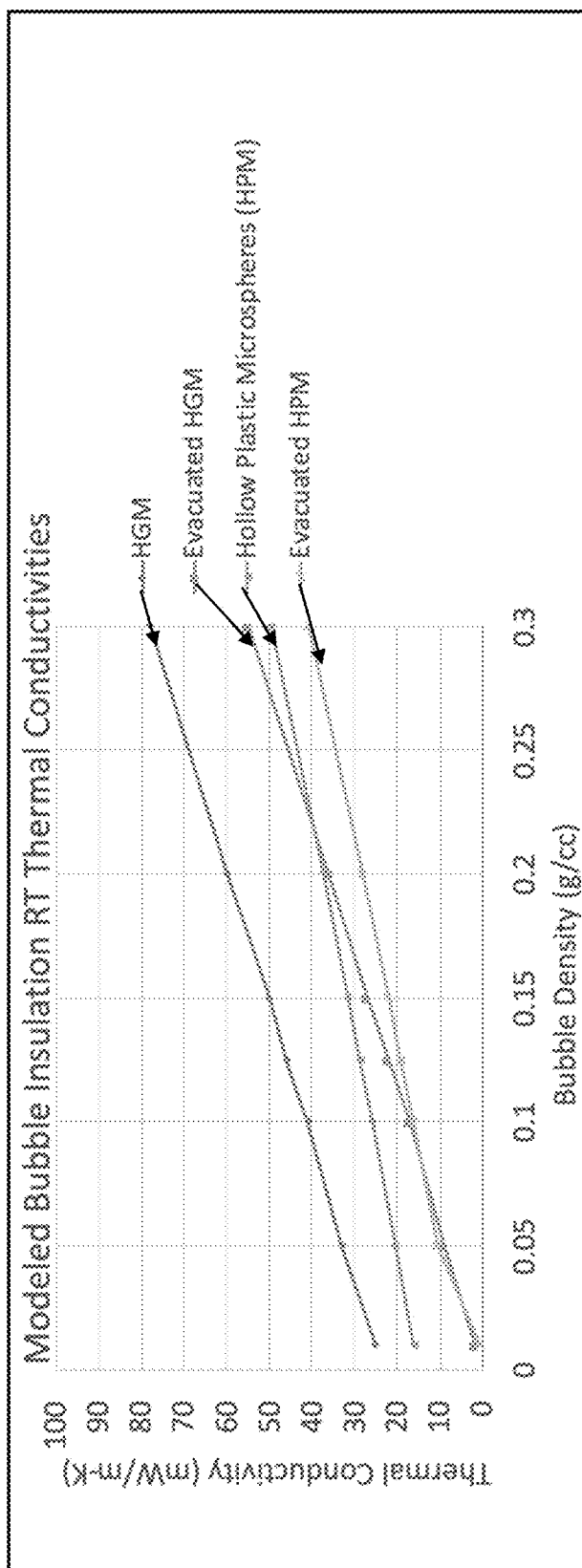
FIG. 10 provides thermal modeling of capsules of both evacuated and non-evacuated glass and plastic materials. Lower density, material thermal conductivity and evacuation all have an effect on total thermal conductivity.
Figure 11:
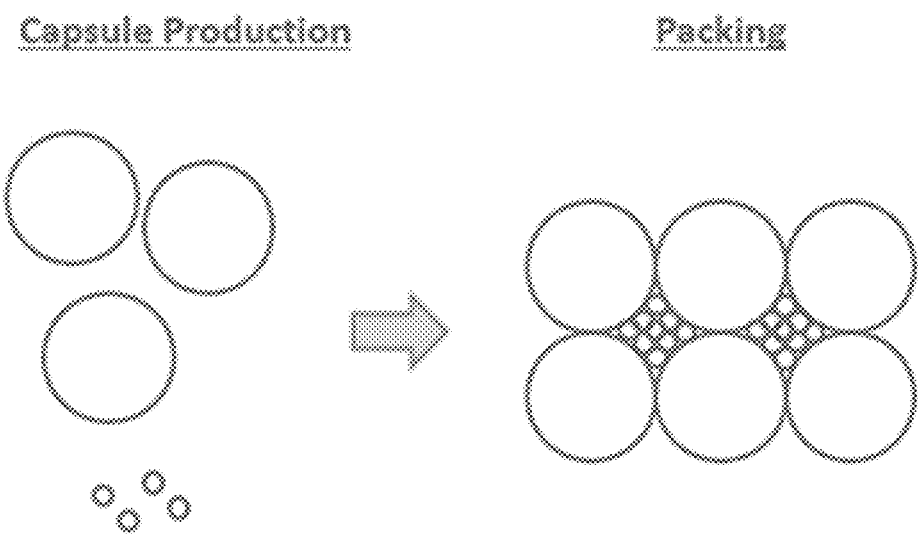
FIG. 11 illustrates improvement of packing density of using different size capsules to fill interstitial spaces. As an example, hollow capsules are heated to 350-400° C. for 20-40 minutes. Smaller capsules or filler such as silica is used to fill the interstitial space, increasing packing density to as high as 95%.
Figure 12:
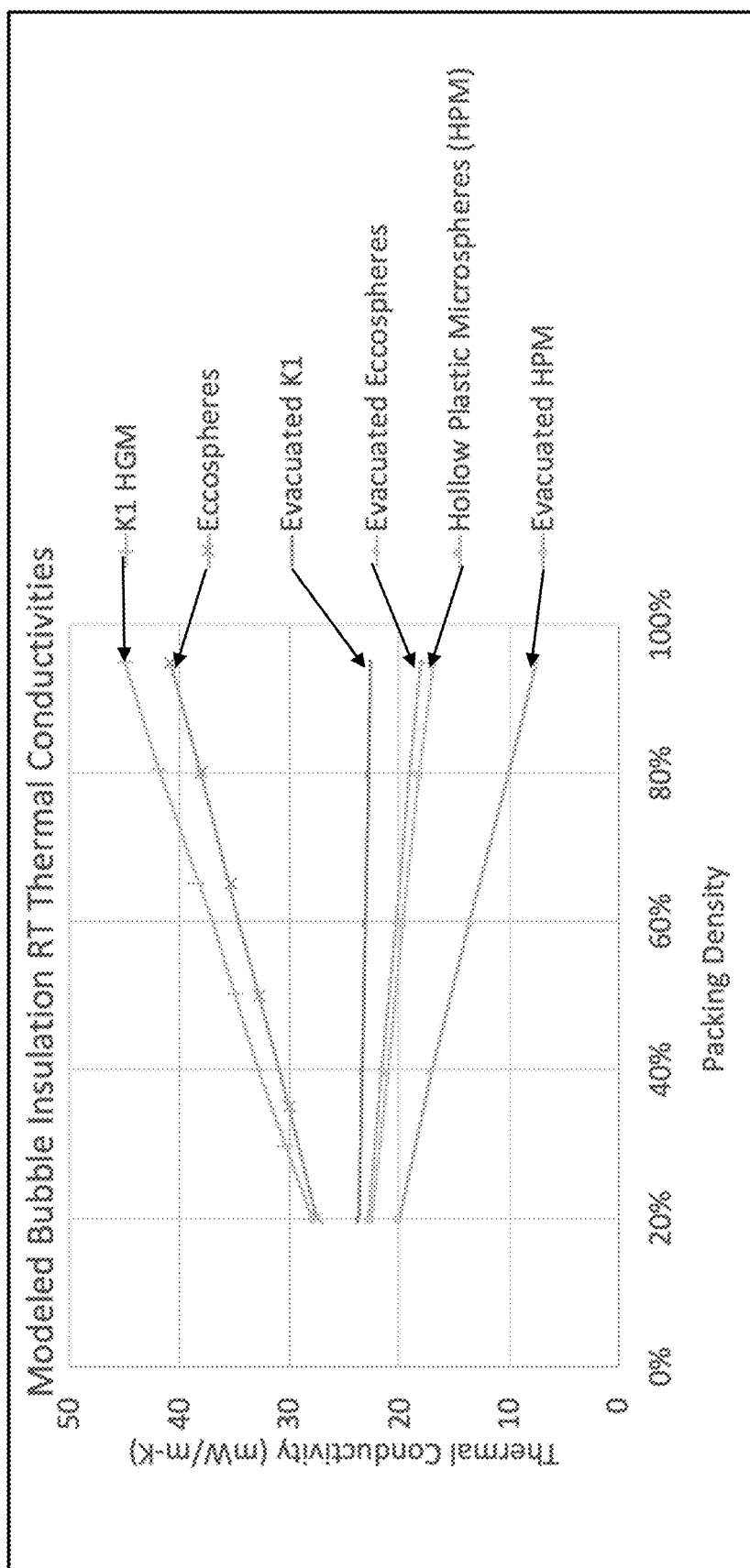
FIG. 12 provides model thermal conductivity related to packing density of various capsule materials. Some capsules can provide lower thermal conductivity than that of air.
Figure 13:
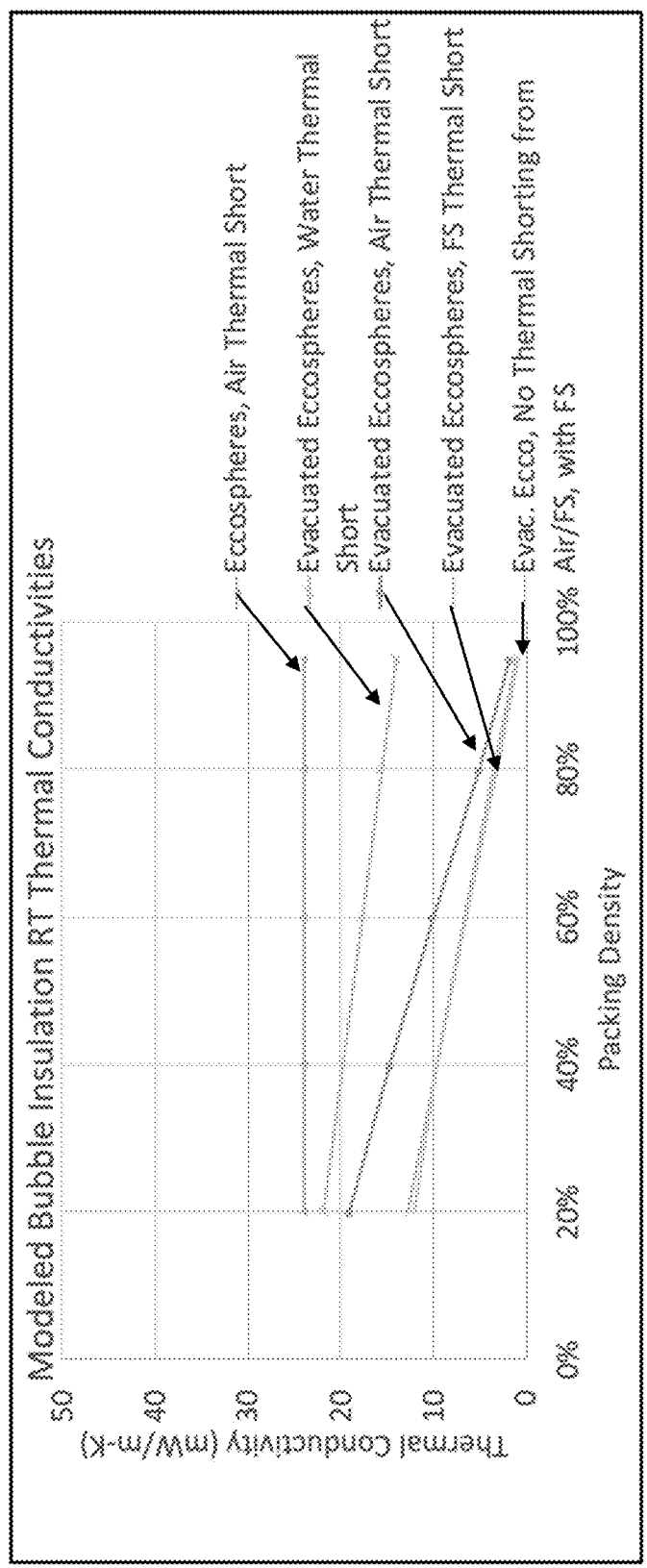
FIG. 13 provides model thermal conductivity related to packing density inclusive of shorting between capsules or bubbles. Ice formation effectively has 100% of bubble material contribution to thermal conductivity. With fused silica, thermal shorting may be prevented.
Figure 14:
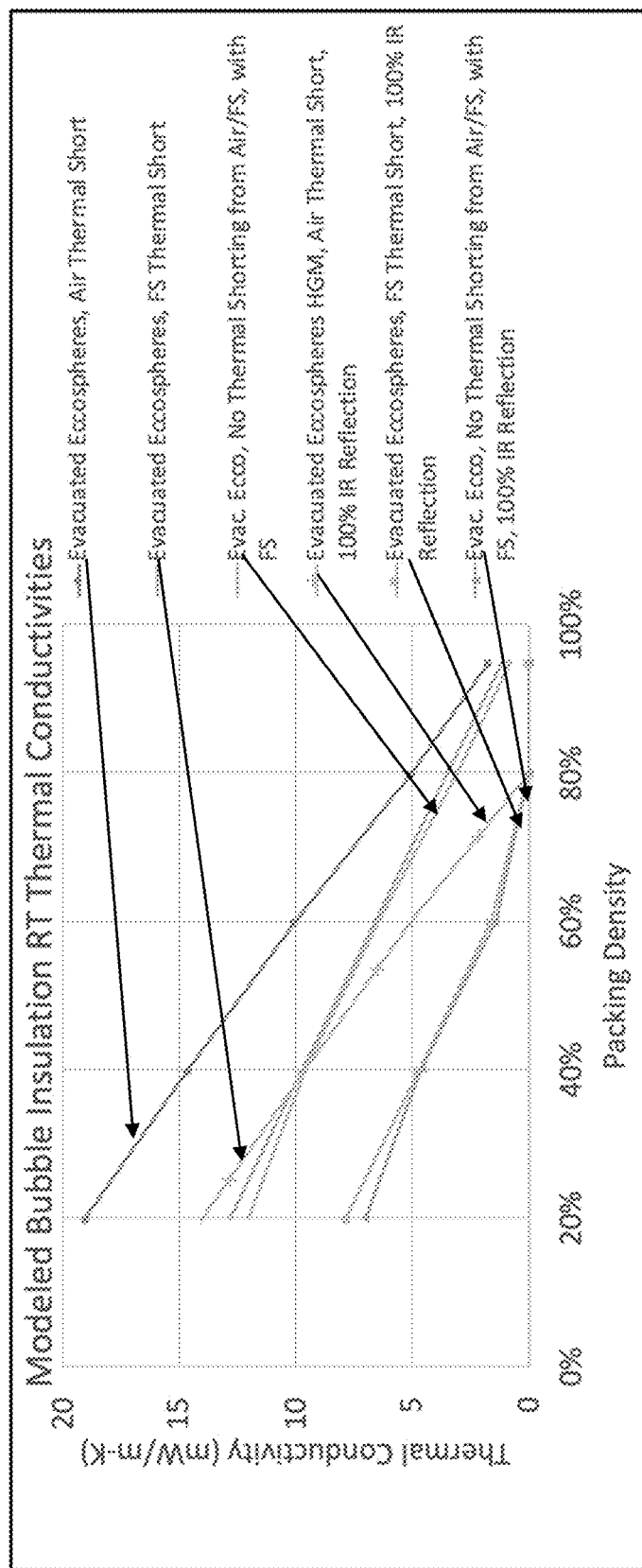
FIG. 14 provides model thermal conductivity related to packing density illustrating that radiative transport may contribute to overall thermal conductivity on the order of 4 to 10 mW/m-K.
Figure 15:
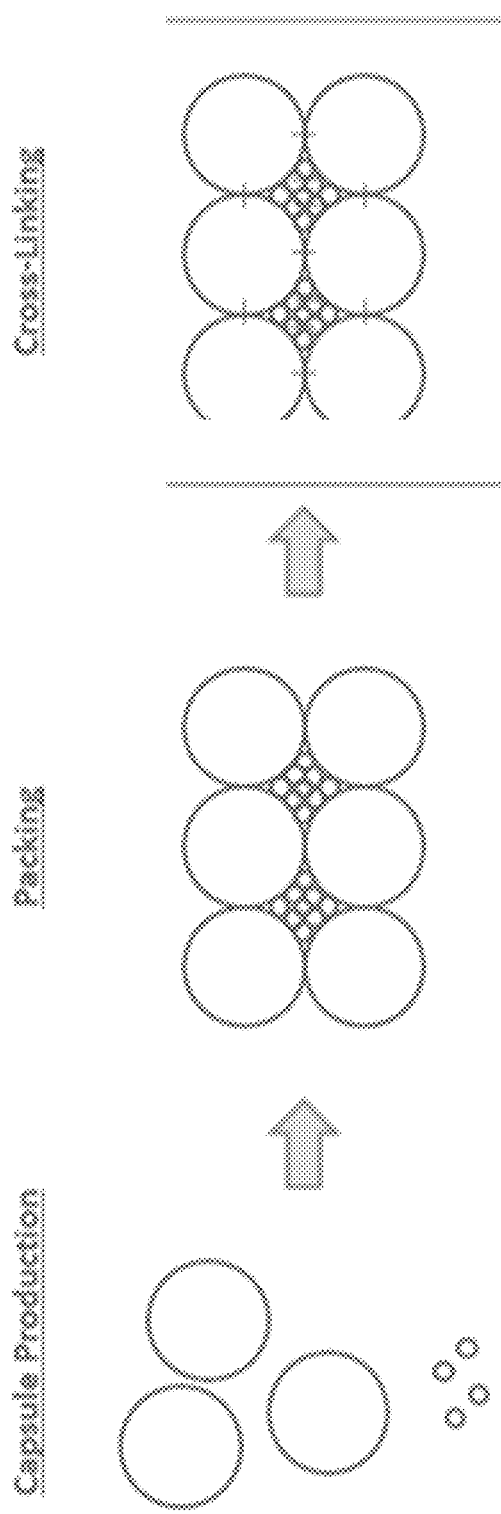
FIG. 15 illustrates crosslinking of capsules with increased packing density.
Figure 16:
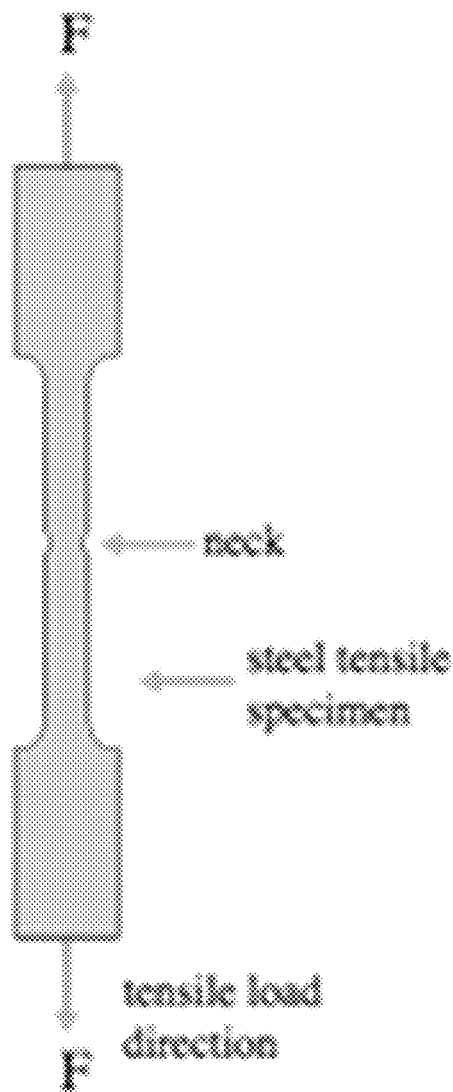
FIG. 16 illustrates mechanical testing for compression, shear, tensile and three point bend strength.
Figure 17:
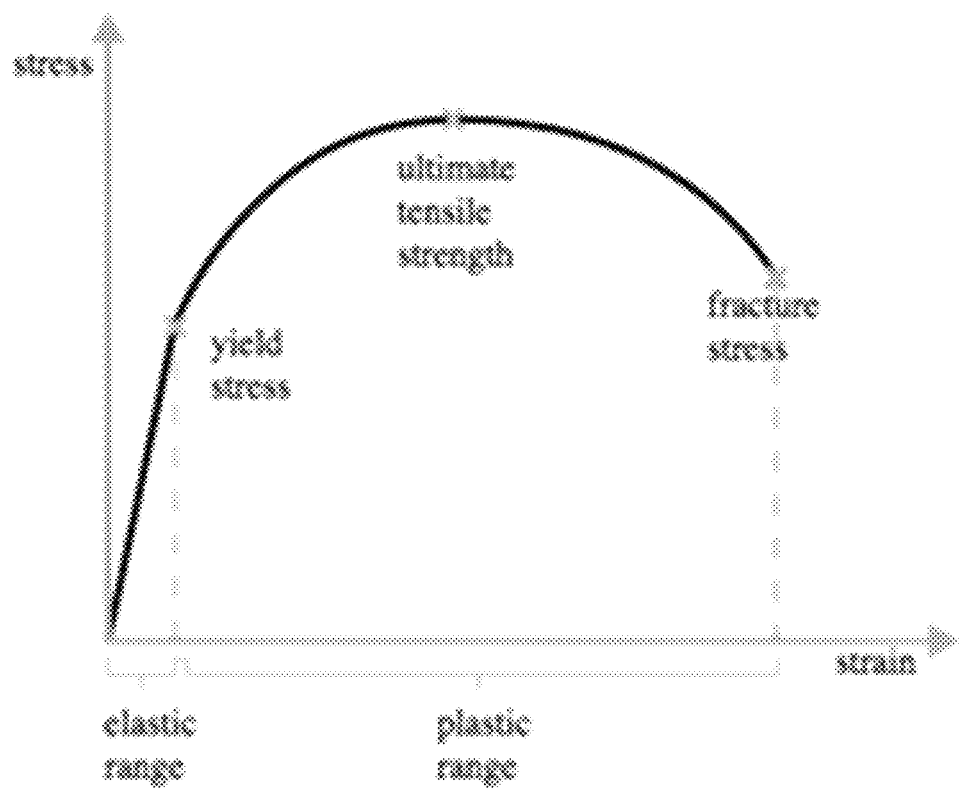
FIG. 17 illustrates mechanical testing for compression, shear, tensile and three point bend strength.

Described herein are processes for forming thin capsule insulation with very high R-values (greater than R20/inch) to revolutionize different industries. The described MCI will cost effectively address many of the highest energy efficiency priorities to ultimately save quads of energy across just about all industrial sectors. Demonstrated here is a strong, well-integrated insulation "panel" or "blanket" using insulating capsules. This effort describes the use of evacuated capsules to form an effective "self-supporting solid" (as compared to powder) insulating "blanket," "panel," or other useful form factors (FIG. 5). Described herein are scalable and inexpensive processes using inexpensive materials. Provided are the following technical and economic improvements:

1. Identification of low-cost processes using commercially available materials to provide the appropriate crosslinking of the insulating capsules to form useful, strong insulating structures while maintaining very low thermal conductivity. This includes processes that can be performed at atmospheric pressures to eliminate the need for more expensive evacuated processing chambers. It also includes potential inexpensive methodologies to adjust the strength, hydrophobicity, vapor transport, flexibility, and durability of the resultant capsule insulation based on the application requirements.
2. Identification and demonstration of viable routes to increase the evacuated volume in the insulation, which contributes to the final insulation value achieved.
3. Establish the appropriateness for different measurement capabilities for our unique insulation samples. This included using a double shear test to quantify crosslinking strength, pycnometry to measure air space outside of capsules (packing density), measuring water vapor transmittance rates, and thermal conductivity measurements to accurately measure the absolute apparent/effective thermal conductivity (ATC). The ATC measurement is relevant development and optimization of highly insulating materials because to date, no measurement system can provide absolute and accurate measurements on small "laboratory" scale samples with thermal conductivities less than 0.01 W/m-K at atmospheric pressure. This is important because the described insulating capsule samples have ATCs between 0.001 W/m-K and 0.01 W/m-K, and rapid development and commercialization demands quick and accurate measurements of smaller samples to help select materials and optimize process parameters.
4. Fabricated novel insulating capsule samples (Table 1) with measured TC values less than 0.01 W/m-K (experimental error+/−0.005 W/m-K).

The described microcapsules are powders that may have thermal conductivities between 0.04 and 0.15 W/m-K. Microcapsules can be used to decrease thermal conductivity in host materials and can provide insulating properties because the gas/air inside typically has low thermal conductivity and if their wall thicknesses are relatively thin the overall apparent/effective thermal conduction is low. The ATC of materials with embedded microcapsules is dominated by the thermal conductivity of the host materials (e.g., polymers or ceramics), resulting in typical ATCs in the 0.1 to 1 W/m-K range. The described packing and crosslinking method may be useful to create products that can be easily integrated into various insulation markets while creating and maintaining low thermal conductivity properties of the insulating capsules. The described processing routes provide insulative materials with low thermal conductivity (<0.01 W/m-K). Cross-linking of loose, insulating, evacuated capsules, capsules and/or particle powders results in inexpensive (as low as $0.05/R/in-sf) solid and potentially flexible insulating structures that can be handled and treated in a manner similar to many commercially available rigid foam panel insulations. The resulting solid insulative materials may be made by using standard manufacturing approaches such as roll-to-roll and continuous assembly processing at atmospheric or near atmospheric conditions to maintain low processing costs.

Described herein are processing methods for making solid insulative materials comprised of crosslinked insulating capsules. These solid insulative materials are capable of being nailed, screwed, cut and adhered to boards and papers without losing their structural integrity or substantially effecting the superior insulative properties of the material (FIG. 5). Briefly, the evacuated capsules were crosslinked while maintaining optimal configurations enabling the intrinsic shape and structure to be designed and created. Either before or during the crosslinking processing step other processes can be used to increase the strength of the crosslinking bonds between the insulating capsules or strengthen the insulative material composite. In both cases, the mechanical properties of the solid insulative material were improved (e.g., compression strength increased) while maintaining thermal conductivities typically less than 0.025 W/m-K. To further decrease the thermal conductivity, solid insulative capsules may be combined with opacifiers (conducting metal oxides (e.g., iron oxide), carbon black, silicon carbide or conducting polymers) to decrease radiative transport and emissivity. Opacifiers were demonstrated that can be mixed with the insulating capsules or integrated with subsequent processing.

Because of the myriad of thermal leaks from outside environmental components, obtaining accurate thermal conductivity measurements on the smaller samples often produced in laboratories is challenging. Accordingly, a unique thermal conductivity measurement system is disclosed. This system to date is the only technique demonstrated to be able to provide "absolute" measurements of relatively small samples (i.e., 8" (20.3 cm) diameter by 1" (2.54 cm) thick or smaller) with thermal conductivities lower than 0.0001 W/m-K. However, most of the experience with this TC measurement system is under some amount of vacuum (especially for thermal conductivities below 0.01 W/m-K), and therefore it was important to develop procedures that provide reproducible measurements of highly insulating materials (i.e., below 0.01 W/m-K) at atmospheric pressures. The present inventors have successfully performed systematic tests (see Table 2 below) to identify "standard measurement protocols" that provide reproducible results enabling us to quantify the accuracy of the TC system for materials with thermal conductivities below 0.01 W/m-K at standard atmospheric pressures. Several factors were identified that may influence the TC measurements. These factors include:
  1. Sample integration into the holder
  2. Humidity and oxygen within the chamber and in the ambient air
  3. Fill dynamics of the cold head
  4. System equilibration time of the cold head
  5. Inert gas purging of the chamber before and during measurements Utilizing a standard insulating sample and performing repeated measurements, it was evident that active nitrogen purging of the chamber during measurements (to help control water vapor condensation on the cold head) induced substantial measurement variability within a run, run to run, and day to day. Interestingly, turning on the gas purge initially increased the thermal conductivity measurement values (as expected due to increasing the amount of heat in the system), while turning off the gas purge decreased the measurement values. The overall impact of having active gas purging reduced the overall thermal conductivity measurement values. In general, the measurement process used is an intrinsically "chaotic" process that results in constant small fluctuations in the measurement. In addition, the system uses what has been described by the inventors as a "dynamic" approach such that the procedures that are used to fill the cold head of the measurement system and start the measurements may impact the measurements. These measurement fluctuations are exacerbated when operating at atmospheric pressures where the measurement times between coolant refills become very short due to the thermal conduction of air in the chamber resulting in more heating of the "guard" chamber of the measurement system that keeps external heat away from the active measurement sensor. The result is that thermal conductivity measurements may take several days to perform in order for the system to reach thermal equilibrium.

A summary of the thermal conductivity measurement system procedure for achieving repeatable test conditions (at atmospheric pressure) includes the following:
  1. The amount of water vapor inside the reaction or processing chamber must be controlled and minimized to reduce measurement variability. The change in relative humidity of the ambient air in the laboratory significantly impacts the measurement when the chamber is open to laboratory air. Active purging of the chamber with ultra-dry nitrogen/air alone is not adequate. Thus, the first step after the sample is loaded into the chamber is to evacuate the sample chamber if the sample will permit. Otherwise, purging the chamber with ultra-dry nitrogen/air until a dew point of less than −50° C. is achieved in the chamber is recommended. It may take 10 to 40 h of active evacuation of the chamber by a vacuum pump to remove the water adsorbed in the chamber.
  2. Back fill the chamber with ultra-dry nitrogen/air to ~760 torr while keeping the chamber sealed from outside air.
  3. Begin the measurement by following the standard protocol and adding coolant to the test and guard chambers.
  4. Once completely filled with coolant, let the system rest for ~1 h to come to thermal equilibrium.
     a. A ~1 h wait time appeared to be sufficient, but longer wait times may be needed if the chamber is substantially out of thermal equilibrium (e.g., if heat is used to help degas the chamber additional time may be needed for the chamber to reach thermal equilibrium).
  5. Refill the guard and test chambers with coolant and wait for ~15 minutes. Longer times did not seem to impact the measurement.
     a. Often the chamber may take 2 to 20 h to reach a final thermal equilibrium. At this point, the measured value of the test chamber must reach a constant value. This is the best measure for determining when the chamber has reached a thermal equilibrium.
  6. The guard chamber will often run short of coolant long before the test ends. Under these conditions, refill just the guard chamber. This has the least amount of impact on the measurement.
  7. While it may be possible to fill both the guard and test chambers if the temperature has risen substantially after an overnight period, it is recommended to restart the measurement by allowing the system to warm up to ambient temperature and beginning the procedure at step #1.

The procedure above reduced the measurement variability by well over 50% and enabled reproducible measurements.

TABLE 2

Thermal Conductivity Measurement Qualification Test Parameters Evaluated.

| Control Variables | Outcomes |
|---|---|
| Equilibration time after initial coolant fill | The following procedure appears to be appropriate: A 1 h wait time after the initial coolant fill, followed immediately by another fill and a 15 minute wait time. Exception, if the chamber is substantially hotter or colder than ambient prior to the initial coolant fill. |
| Number of coolant fills with hold times | Due to issues discussed below, measurements will need to be performed with the first test fill and at most a second guard fill. A subsequent fill of both chambers is useful to see if there is repeatability but if there is a substantial change then the measurement needs to be restarted from the beginning |
| Total time at cold source working temp | Depending on the sample, the chamber/test takes 4 to 12+ h to reach equilibrium after coolant is introduced. This may be longer if chamber is at sub-ambient pressures. |
| Hold time after top off | 15 minutes appears to work well. |
| Refilling only guard | This is the preferred method to get reproducible data over a longer time period. |
| Amount of aerogel powder | Increasing the amount of aerogel powder to completely cover the top of the guard chamber appeared to improve reproducibility. Recommend 12-14 cups of aerogel fill or add until~2" on top of guard. |
| Dew point of chamber after evacuation | In general, the dew point decreases once coolant is added because the guard chamber acts as a cold-mass vacuum pump. |
| Dew point in chamber/length of time evacuating | A low amount of water in the test chamber is critical for measurement reproducibility. Because of the high surface area of the aerogel insulation and perhaps of the sample, even opening the chamber in dry air conditions results in a lot of adsorbed water. Using a mechanical pump, it can take 10 to 30 h to reach a vacuum level of~50 millitorr. This is one indicator that a substantial amount of water has been removed. |
| Monitor RH outside chamber | Outside RH does not impact the measurement if the chamber is sealed from outside air. However, variability of RH outside the chamber does increase variability of the measurement if the chamber is opened to outside air. This was a major issue with the initial measurements before the chamber was sealed, evacuated, and filled with dry $N_2$. |
| Lab temperature Correlate different temperatures | Does not appear to influence the measurement. Heating the chamber to help remove water results in a much longer time for the chamber to reach equilibrium once coolant is added. |
| Calibration sample #1: Aerogel blanket | Multiple runs completed with this sample to work through various measurement parameters and protocols. Measured TC~15 mW/m-K +/− 5. |
| Fumed silica with opacifier | Measured TC~18 mW/m-K +/− 3. |
| MCI sample #1 | Measured TC~9 mW/m-K +/− 5. |
| MCI sample #2 | Measured TC~9 mW/m-K +/− 5. |

The present invention may be further understood by the following examples:

1. An insulating material comprising:
   a plurality of insulating particles;
   a polymer crosslinking the plurality of insulating particles, wherein the polymer comprises an adhesive;
   wherein the plurality of insulating particles have a packing density greater than or equal to 60%.
2. The insulating material of example 1, wherein the adhesive comprises a cyanoacrylate.
3. The insulating material of example 1 or 2, wherein the insulating material has a thermal conductivity less than or equal to 9 mW/m-K.
4. The insulating material of any of examples 1-3, wherein the polymer further comprises a boron-containing strengthening agent.
5. The insulating material of example 4, wherein the boron-containing strengthening agent comprises triisopropyl borate, boron trichloride, trimethyl borate or a combination thereof.
6. The insulating material of any of examples 1-6 further comprising a plurality of reinforcing fibers.
7. The insulating material of example 6, wherein the reinforcing fibers comprises cellulose, a plant material, a second polymer, glass or a combination thereof.
8. The insulating material of example 6 or 7, wherein the reinforcing fibers is chemically bonded to the polymer, physically bound to the polymer, dispersed in void space between the insulating particles, or a combination thereof.
9. The insulating material of any of examples 1-8, wherein the insulating material has a maximum compressive stress greater than or equal to 0.10 MPa.
10. The insulating material of any of examples 1-9, wherein the insulating material has a maximum compressive strength greater than or equal to 0.48 MPa at 10% deformation.
11. The insulating material of any of examples 1-10, wherein the insulating material has a shear strength greater than or equal to 0.05 MPa.
12. The insulating material of any of examples 1-11, wherein the insulating material has a tensile strength greater than or equal to 0.05 MPa.
13. The insulating material of any of examples 2-12, wherein the cyanoacrylate comprises methyl cyanoacrylate, ethyl cyanoacrylate, butyl cyanoacrylate, octyl cyanoacrylate or a combination thereof.
14. The insulating material of any of examples 2-13, wherein the cyanoacrylate comprises ethyl 2-cyanoacrylate and octyl cyanoacrylate.
15. The insulating material of any of examples 1-14, wherein the polymer encapsulates an outer surface of the plurality of insulating particles.
16. The insulating material of any of examples 1-15, wherein the polymer does not fully encapsulate an outer surface of the plurality of insulating particles.
17. The insulating material of any of examples 1-16, wherein the polymer is deposited on an outer surface of the plurality of insulating particles at a thickness selected from the range of 5 to 10 monolayers.
18. The insulating material of any of examples 1-17, wherein the plurality of insulating particles comprise a fluoropolymer coating.
19. The insulating material of any of examples 1-18, wherein the plurality of insulating particles comprise fumed silica.
20. The insulating material of any of examples 1-19, wherein the plurality of insulating particles comprise a plurality of hollow capsules.
21. The insulating material of example 20, wherein the plurality of hollow capsules have a diameter selected from the range of 5 nm to 1 cm.
22. The insulating material of example 21 wherein the plurality of hollow capsules comprise:
   a plurality of small hollow capsules; and
   a plurality of large hollow capsules.
23. The insulating material of example 22, wherein the plurality of small hollow capsules have a diameter selected from the range of 0.01 mm to 0.03 mm.

24. The insulating material of example 22 or 23, wherein the plurality of large hollow capsules have a diameter selected from the range of 0.1 mm to 1 mm.
25. The insulating material of any of examples 22-24, wherein the plurality of small hollow capsules have an average diameter with a ratio selected from the range of 1:2 to 1:10 with respect to an average diameter of the large hollow capsules.
26. The insulating material of any of examples 20-25, wherein the hollow capsules have an internal pressure of about 1 atm.
27. The insulating material of any of examples 20-25, wherein the hollow capsules have an internal pressure less than or equal to 0.001 atm.
28. The insulating material of any of examples 20-27, wherein the hollow microspheres comprise hollow glass microspheres.
29. A method comprising:
    providing a plurality of insulating particles with a packing density greater than or equal to 60%;
    depositing or having water on a least a portion of an outer surface of the plurality of insulating particles; and
    reacting at least one type of cyanoacrylate monomer assisted by the water to generate a polymer network, thereby crosslinking the plurality of insulating particles and generating an insulating material;
    wherein the insulating material has a thermal conductivity less than or equal to 0.1 W/m-K.
30. The method of example 29, wherein the cyanoacrylate is provided in a vapor phase.
31. The method of example 29 or 30 further comprising reacting a boron-containing strengthening agent with the cyanoacrylate, the polymer network or a combination thereof.
32. The method of example 31, wherein the boron-containing strengthening agent is provided in a vapor phase.
33. The method of any of example 29-32 further comprising providing a reinforcing fiber, wherein the reinforcing fiber is chemically bonded to the polymer network, physically bound to the polymer network, contained in a void space between the insulating particles or a combination thereof.
34. The method of any of examples 29-33 further comprising coating the insulating particles with a fluoropolymer, thereby altering the surface hydrophobicity of the plurality of insulating particles.
35. The method of any of examples 29-34, wherein the plurality of insulating particles comprise fumed silica.
36. The method of any of examples 29-35, wherein the plurality of insulating particles comprise hollow capsules.
37. The method of example 36, wherein the plurality of insulating particles comprise hollow glass microspheres.
38. An insulating material comprising close-packed hollow capsules, wherein each capsule is at least partially covered with a layer of a polymer adhesive having a substantially uniform thickness of at least 1 monolayer which bonds the hollow capsules together.
39. The insulating material of example 38, wherein the layer of polymer adhesive covers at least 1% to 100% of a surface area of each capsule.
40. The insulating material of example 38 or 39, wherein a layer of polymer adhesive is interposed between neighbouring capsules.
41. The insulating material of example 38 or 39, wherein at least some of the hollow capsules are in direct contact with one another.
42. The insulating material of any of examples 38-41, wherein the polymer adhesive comprises at least one polymer adhesive selected from polycyanoacrylates, polyvinyl alcohols, polypyrroles, poly(alkylenedioxythiophenes), polyimides, polyazomethines, polyureas, polyamides, polyimide-polyamides, polythioureas, polyethylene terephthalate, and alucones.
43. The insulating material of any of examples 38-41, wherein the polymer adhesive comprises a cyanoacrylate adhesive.
44. The insulating material of any of examples 38-43, wherein the thickness of the layer of polymer adhesive is selected from the range of 1 to 10 monolayers.
45. The insulating material of any of examples 36-44, wherein the polymer adhesive and hollow capsules are covalently bonded with a strengthening agent, e.g., a boron-containing moiety.
46. The insulating material of any of examples 36-45, wherein the hollow capsules are at least partially coated with a low-emissivity coating.
47. The insulating material of examples 46, wherein the low-emissivity coating comprises a conducting polymer, preferably polypyrrole or poly(3,4-ethylenedioxythiophene.
48. The insulating material of example 46 or 47, wherein the low-emissivity coating comprises a comprises a conducting oxide semiconductor, preferably tin oxide, indium oxide, titanium oxide, zinc oxide, boron tin trioxide or a combination thereof.
49. The insulating material of any of examples 36-48, wherein the hollow capsules comprise first and second pluralities of hollow capsules of different size distributions; the hollow capsules of the first plurality having a mean diameter which is greater than the mean diameter of the hollow capsules of the second plurality; the two pluralities of hollow capsules being substantially heterogeneously mixed to increase packing density.
50. The insulating material of example 49, wherein the packing density of hollow capsules is selected from the range of 50% to 99%.
51. The insulating material of example 49 or 50, wherein the ratio of mean diameters of the larger hollow capsules to the smaller hollow capsules is between 2:1 and 4:1.
52. The insulating material of any of examples 49-51, wherein the ratio of the number of smaller capsules to larger capsules is between 5:1 and 15:1.
53. The insulating material of any of examples 36-52, wherein the hollow capsules are evacuated.
54. The insulating material of any of examples 36-53, wherein the insulating material further comprises silica filler particles which are disposed in interstices between the hollow glass spheres.
55. The insulating material of example 54, wherein each of the silica particles is at least partially covered with a layer of polymer adhesive which bonds the fumed silica particles to the hollow glass spheres.
56. An insulating composite comprising the insulating material according to any preceding example and a substrate.
57. A building material selected from drywall, plywood board, insulating panels for use in refrigerators/freezers, shipping containers and construction, comprising the insulating material according to any of examples 36 to 56.

58. A method of making an insulating material comprising:
   a) close packing a plurality of hollow capsules into a mold,
   b) infusing the mold with at least one gas phase precursor that polymerizes to form a polymer adhesive, and
   c) causing or allowing the precursor to polymerize on exterior surfaces of the hollow capsules,
   thereby bonding the hollow capsules together.
59. The method of example 58, wherein the hollow capsules have two distinct size distributions, and the method comprises substantially homogeneously mixing the hollow capsules prior to packing in the mold.
60. The method of example 58 or 59, further comprising the step of substantially homogeneously mixing the hollow capsules with fumed silica particles prior to packing in the mold.
61. The method of any of examples 58-60, further comprising infusing the hollow capsules in the mold with a strengthening agent which is adapted to form covalent bonds with the hollow capsules and polymer adhesive.
62. The method of any of examples 58-61, wherein the at least one precursor comprises at least one homobifunctional precursor.
63. The method of example 62, wherein the at least one homobifunctional precursor is selected from one or more of diamines, dienes, diisocynates, diisothiocyanates, dialdehydes, dianhydrides, diols, e.g. glycols, dithiols, dihalides, e.g. dichlorides, di- or tri-alkoxysilanes, and alkylenedioxythiophenes.
64. The method of examples 62 or 63, wherein two or more homobifunctional precursors are infused into the mold.
65. The method of any of examples 62 to 64, further comprising reacting the at least one precursor in the presence of an accelerator, initiator, catalyst and/or one or more additional precursors.
66. The method of example 65, wherein the accelerator, initiator, oxidant, catalyst and/or additional precursor(s) is co-delivered simultaneously or sequentially with the at least one precursor.
67. The method of example 65, wherein the accelerator comprises water vapor which is present on the surface of the hollow capsules.
68. The method of example 65, wherein the hollow capsules have modified exterior surfaces to cause or allow polymerization of the at least one precursor.
69. The method of any of examples 58-68, wherein the at least one precursor is selected from one or more of a $C_{1-10}$alkyl cyanoacrylate monomer, vinyl acetate, pyrrole and 3,4-ethylenedioxythiophene.
70. The method of example 69, wherein the $C_{10}$alkyl cyanoacrylate monomer is selected from one or more of methyl cyanoacrylate, ethyl cyanoacrylate, butyl cyanoacrylate and octyl cyanoacrylate.
71. The method of any of examples 58-70, further comprising causing or allowing the at least one precursor to flow through the hollow capsules in the mold prior to bonding.
72. The method of any of examples 58-71, wherein the at least one precursor is infused under a pressure below atmospheric pressure.
73. The method of any of examples 58-72, wherein the at least one precursor is infused at a temperature above the boiling point of the polymer adhesive.
74. The method of example 73, wherein the at least one precursor is infused at a temperature below about 200° C.
75. The method of any of examples 58-74, further comprising at least partially coating the hollow capsules with a low-emissivity coating.
76. The method of example 75, wherein the low-emissivity coating comprises a conducting oxide semiconductor, preferably tin oxide, indium oxide, titanium oxide, zinc oxide, boron tin trioxide or a combination thereof, which is applied to the hollow capsules by atomic layer deposition.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

When a group of substituents is disclosed herein, it is understood that all individual members of that group and all subgroups, are disclosed separately. When a Markush group or other grouping is used herein, all individual members of the group and all combinations and subcombinations possible of the group are intended to be individually included in the disclosure. For example, when a device is set forth disclosing a range of materials, device components, and/or device configurations, the description is intended to include specific reference of each combination and/or variation corresponding to the disclosed range.

Every formulation or combination of components described or exemplified herein can be used to practice the invention, unless otherwise stated.

Whenever a range is given in the specification, for example, a density range, a number range, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

References cited herein are incorporated by reference herein in their entirety to indicate the state of the art as of their publication or filing date and it is intended that this information can be employed herein, if needed, to exclude specific embodiments that are in the prior art. For example, when composition of matter is claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. An insulating material comprising:
   a plurality of insulating particles;
   a polymer crosslinking the plurality of insulating particles, wherein the polymer comprises an adhesive;
   wherein the plurality of insulating particles have a packing density greater than or equal to 50%;
   wherein the boron-containing strengthening agent comprises triisopropyl borate, boron trichloride, trimethyl borate or a combination thereof.

2. The insulating material of claim 1, wherein the insulating material has a thermal conductivity less than or equal to 9 mW/m-K.

3. The insulating material of claim 1, wherein the insulating material has a maximum compressive stress greater than or equal to 0.10 MPa.

4. The insulating material of claim 1, wherein the insulating material has a maximum compressive strength greater than or equal to 0.48 MPa at 10% deformation.

5. The insulating material of claim 1, wherein the insulating material has a shear strength greater than or equal to 0.05 MPa.

6. The insulating material of claim 1, wherein the insulating material has a tensile strength greater than or equal to 0.05 MPa.

7. The insulating material of claim 1, wherein the polymer is deposited on an outer surface of the plurality of insulating particles at a thickness selected from the range of 5 to 10 monolayers.

8. The insulating material of claim 1, wherein the adhesive comprises a cyanoacrylate.

9. The insulating material of claim 8, wherein the cyanoacrylate comprises methyl cyanoacrylate, ethyl cyanoacrylate, butyl cyanoacrylate, octyl cyanoacrylate or a combination thereof.

10. The insulating material of claim 1 further comprising a plurality of reinforcing fibers.

11. The insulating material of claim 10, wherein the reinforcing fibers comprises cellulose, a plant material, a second polymer, glass or a combination thereof.

12. The insulating material of claim 1, wherein the plurality of insulating particles comprise a plurality of hollow capsules.

13. The insulating material of claim 12 wherein the plurality of hollow capsules comprise:
   a plurality of small hollow capsules having a diameter selected from the range of 0.01 mm to 0.03 mm; and
   a plurality of large hollow capsules having a diameter selected from the range of 0.1 mm to 1 mm.

14. The insulating material of claim 12, wherein the hollow capsules have an internal pressure less than or equal to 0.001 atm.

* * * * *